US012785755B2

(12) United States Patent
Beckman

(10) Patent No.: US 12,785,755 B2
(45) Date of Patent: *Nov. 3, 2026

(54) CROWDSOURCED WIRELESS POWER DISTRIBUTION AND MONETIZATION

(71) Applicant: Christopher V. Beckman, Miami, FL (US)

(72) Inventor: Christopher V. Beckman, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/031,886

(22) Filed: Jan. 18, 2025

(65) Prior Publication Data

US 2025/0167832 A1 May 22, 2025

Related U.S. Application Data

(63) Continuation of application No. 18/203,636, filed on May 30, 2023, now Pat. No. 12,284,002, which is a continuation-in-part of application No. 17/499,606, filed on Oct. 12, 2021, now Pat. No. 11,664,851, which is a continuation-in-part of application No. 16/929,076, filed on Jul. 14, 2020, now Pat. No. 11,146,119, which is a continuation-in-part of application No. 16/049,703, filed on Jul. 30, 2018, now Pat. No. 10,714,980, which is a continuation-in-part of application No. 14/557,444, filed on Dec. 1, 2014, now Pat. No. 10,038,341, which is a continuation-in-part of application No. 14/306,216, filed on Jun. 16, 2014, now Pat. No.

(Continued)

(51) Int. Cl.
*H02J 50/80* (2016.01)
*G06Q 30/0207* (2023.01)
*H02J 50/10* (2016.01)
*H04B 5/79* (2024.01)

(52) U.S. Cl.
CPC ........... *H04B 5/79* (2024.01); *G06Q 30/0207* (2013.01); *H02J 50/10* (2016.02); *H02J 50/80* (2016.02)

(58) Field of Classification Search
CPC ........................................................ H04B 5/79
USPC ......................................................... 307/104
See application file for complete search history.

(56) References Cited

U.S. PATENT DOCUMENTS

| | | | | |
|---|---|---|---|---|
| 10,910,888 B2 * | 2/2021 | Patmore | ............... | A61G 12/005 |
| 11,146,119 B2 * | 10/2021 | Beckman | ............. | G05B 19/042 |
| 2017/0331319 A1 * | 11/2017 | Nitz | ........................ | H02J 50/10 |

* cited by examiner

*Primary Examiner* — Joseph Chang

(57) ABSTRACT

Wireless power distribution and payment techniques are disclosed. In some aspects of the invention, a system distributes wireless power through a network of crowdsourced wireless power transmission devices, each of which may be independently owned and controlled. The system may create monetary payments and charges based on each device's use and/or facilitation of the wireless power provided through the network, and incentives required to increase performance of the system. In some embodiments, the system may determine monetary credits and/or debits based on the type and amount of power provided by, or other qualities of, wireless power enhancement devices implemented by the network, and users thereof. The system may determine ratings, e.g., based on efficiency of power transmission devices. Such ratings may be determined by consensus, and recorded on a distributed ledger. In some embodiments, at least some of the wireless power transmission devices are included within personal electronics devices.

19 Claims, 26 Drawing Sheets

Related U.S. Application Data

9,496,740, said application No. 16/049,703 is a continuation-in-part of application No. 14/033,456, filed on Sep. 21, 2013, now abandoned, said application No. 14/557,444 is a continuation-in-part of application No. 13/943,778, filed on Jul. 16, 2013, now Pat. No. 8,901,888.

(60) Provisional application No. 61/861,401, filed on Aug. 1, 2013, provisional application No. 61/835,636, filed on Jun. 16, 2013, provisional application No. 61/852,154, filed on Mar. 15, 2013.

CROWDSOURCED WIRELESS POWER DISTRIBUTION AND MONETIZATION

CROSS-REFERENCE TO RELATED APPLICATIONS

This application claims the benefit of U.S. Provisional Patent Application No. 61/835,636, filed Jun. 16, 2013. This application also claims the benefit of U.S. Provisional Application No. 61/852,154, filed Mar. 15, 2013. This application also claims the benefit of U.S. Provisional Application No. 61/861,401, filed Aug. 1, 2013. This application is a continuation of U.S. patent application Ser. No. 18/203,636, filed May 30, 2023, now U.S. Pat. No. 12,284,002, which is a continuation of U.S. patent application Ser. No. 17/499,606, filed Oct. 12, 2021, now U.S. Pat. No. 11,664,851, which is a continuation-in-part of U.S. patent application Ser. No. 16/929,076, filed Jul. 14, 2020, now U.S. Pat. No. 11,146,119, which is a continuation-in-part of U.S. patent application Ser. No. 16/049,703, filed Jul. 30, 2018, now U.S. Pat. No. 10,714,980, which is a continuation-in-part of both U.S. patent application Ser. No. 14/033,456, filed Sep. 21, 2013, and U.S. patent application Ser. No. 14/557,444, filed Dec. 1, 2014, now U.S. Pat. No. 10,038,341, which is a continuation-in-part of both U.S. patent application Ser. No. 13/943,778, filed Jul. 16, 2013, now U.S. Pat. No. 8,901,888, and U.S. patent application Ser. No. 14/306,216, filed Jun. 16, 2014, now U.S. Pat. No. 9,496,740. All of the above applications are incorporated by reference in their entirety into the present application, as if fully set forth herein.

FIELD OF THE INVENTION

The present invention relates to the field of power distribution, control and optimization. More specifically, the present application relates to wireless power transmission and storage systems.

BACKGROUND

Wireless power transmission methods have been under development at least since the time of Nicola Tesla, who invented a form of magnetic field energy transmission using separated coils. In that early invention, a remote energy-transmitting coil creates a magnetic field, which then induces electricity in a local, energy-receiving coil comprised in an electrical circuit. More recently, wireless transmission techniques have implemented resonance—in which the receiving coil is tuned to the same natural frequency as the transmitting coil, improving the efficiency of wireless power transmission.

It should be understood that the disclosures in this application related to the background of the invention, in, but not limited to this section titled "Background," do not necessarily set forth prior art or other known aspects exclusively, and may instead include art that was invented concurrently or after the present invention and conception, and details of the inventor's own discoveries and work and work results.

SUMMARY OF THE INVENTION

New wireless power transmission, monetization, and incentivization techniques are disclosed. In some aspects of the invention, a system distributes wireless power from a power and information transmitting base station, through a network of intermediate wireless power enhancement and consumption devices, each of which may be independently owned and controlled. In some embodiments, the transmitted power is sourced from a variety of power providers. The system may assign invoices comprising monetary credits and debits, based on each device's use and/or enhancement of the wireless power provided through the network. In some embodiments, the system may determine monetary credits and debits based on the identity and/or owner of each device. In some embodiments, the system may determine monetary credits and debits based on one or more sources of wireless power. Other power storage and transmission techniques are also disclosed.

Some techniques in accordance with aspects of the present invention include methods comprising steps to manage wireless power transmissions. Some of such embodiments may include any or all of the following steps: creating a wireless power transmission having an ambient wave in an environment using a first transmitter; monitoring a plurality of wireless power transmission and/or enhancement devices, in some embodiments, referred to as "intermediate wireless power enhancement devices," each of which intermediate wireless power enhancement devices may have a unique identifier, and may occupy a discrete, unique, recorded physical position(s) in space, and wherein each of the wireless power enhancement devices comprises a wireless power enhancing sub-device, such as a resonator; determining a contribution to the strength of the wireless power transmission by at least one of the wireless power transmission and/or enhancement devices; and creating at least one monetary credit for at least one owner of the at least one of the wireless power transmission and/or enhancement devices. In some embodiments, such a method is carried out and/or managed by at least one control system comprising computer hardware and software, such as the example control system set forth in reference to FIG. 13, discussed herein. In some embodiments, such a contribution amount and/or rating is determined by consensus. In some embodiments, a credit or other reward, or a debit or other penalty may also, or additionally, be determined for a user and/or a provider, based on that end user's or provider's use of particular routes through identified and rated wireless power transmission and/or enhancement devices. In some embodiments, such a contribution amount and/or rating and/or such a consensus is determined based on smart contract(s) recorded on a distributed ledger, such as a blockchain(s), within, or connected for communications with, such a control system. For example, in some embodiments, each of a plurality of users and/or computer systems connected to such a distributed ledger may record a determination of a contribution amount and/or rating coefficient of each of a plurality of wireless power transmission and/or enhancement devices. Following such recordings, such a control system may determine such a contribution amount or rating by comparing the recordings. For example, in some embodiments, the control system determines a most frequently submitted amount and/or rating with respect to a particular, identified wireless power transmission and/or enhancement devices. As another example, in some embodiments, the control system determines an amount and/or rating that is an average (e.g., median or mean) of the amount and/or ratings recorded with respect to a particular, identified wireless power transmission and/or enhancement devices. As another example, in some embodiments, the control system determines an amount and/or rating that is within a threshold deviation from one another, tolerance or range of values, of the amount and/or ratings recorded with respect to a particular, identified wireless power transmission and/or enhancement devices.

In some embodiments, at least one additional transmitter (s) is/are used, and monetary debit(s) and/or other penalties, as well as credit(s) and/or other rewards, are determined for at least one owner of such a receiver of such a wireless power transmission, and/or at least one provider of wireless power. In some embodiments, an owner a wireless power receiver is billed for receiving the wireless power transmission, based on such debits or credits. In some embodiments, a contribution amount or rating with respect to wireless power service is assessed for at least one owner of the wireless power enhancement devices, and the owner of the at least one of the wireless power enhancement devices and the owner of the receiver are each provided with an accounting of a balance of credits and/or debits for wireless power service, wherein the wireless power service comprises such a wireless power transmission. In some embodiments, such a wireless power transmission comprises encoded information relating to the wireless power transmission.

In some embodiments, such wireless power enhancement device(s) tune(s) their resonators to maximize the output of such a wireless power transmission (e.g., to maximize the strength of the wireless power transmission at a location of a wireless power receiver). In some embodiments, each such wireless power enhancement device directs its transmitter to maximize the strength of the wireless power transmission at a location of a wireless power receiver.

In some system embodiments of the present invention, at least one base station is included, which is connected with and able to receive power from a power source, wherein the base station comprises a control system and at least one transmitter; which base station is configured to create a wireless power transmission through the at least one transmitter; and its control system is configured to create at least one credit for at least one owner of at least one intermediate wireless power enhancement device, among an array of intermediate wireless power enhancement devices. In some such embodiments, the control system is configured to create at least one debit for an owner of a wireless power receiver. In some embodiments, the control system is configured to bill the owner of the receiver, based on such a debit, for receiving the wireless power transmission. In some embodiments, the control system is configured to determine a contribution amount or rating with respect to such a wireless power service for the at least one owner of the at least one wireless power enhancement device, and the at least one owner of the at least one wireless power enhancement device and the owner of the receiver are each provided with an accounting of a balance of credits and/or debits for wireless power service. In some embodiments, such a contribution amount or rating is determined by consensus.

Canons of Construction and Definitions

Where any term is set forth in a sentence, clause or statement ("statement"), each possible meaning, significance and/or sense of any term used in this application should be read as if separately, conjunctively and/or alternatively set forth in additional statements, as necessary to exhaust the possible meanings of each such term and each such statement.

It should also be understood that, for convenience and readability, this application may set forth particular pronouns and other linguistic qualifiers of various specific gender and number, but, where this occurs, all other logically possible gender and number alternatives should also be read in as both conjunctive and alternative statements, as if equally, separately set forth therein.

These and other aspects of the invention will be made clearer below, in other parts of this application. This Summary, the Abstract, and other parts of the application, are for ease of understanding only, and no part of this application should be read to limit the scope of the invention, whether or not it references matter in any other part.

DETAILED DESCRIPTION OF THE INVENTION

Figure 1:
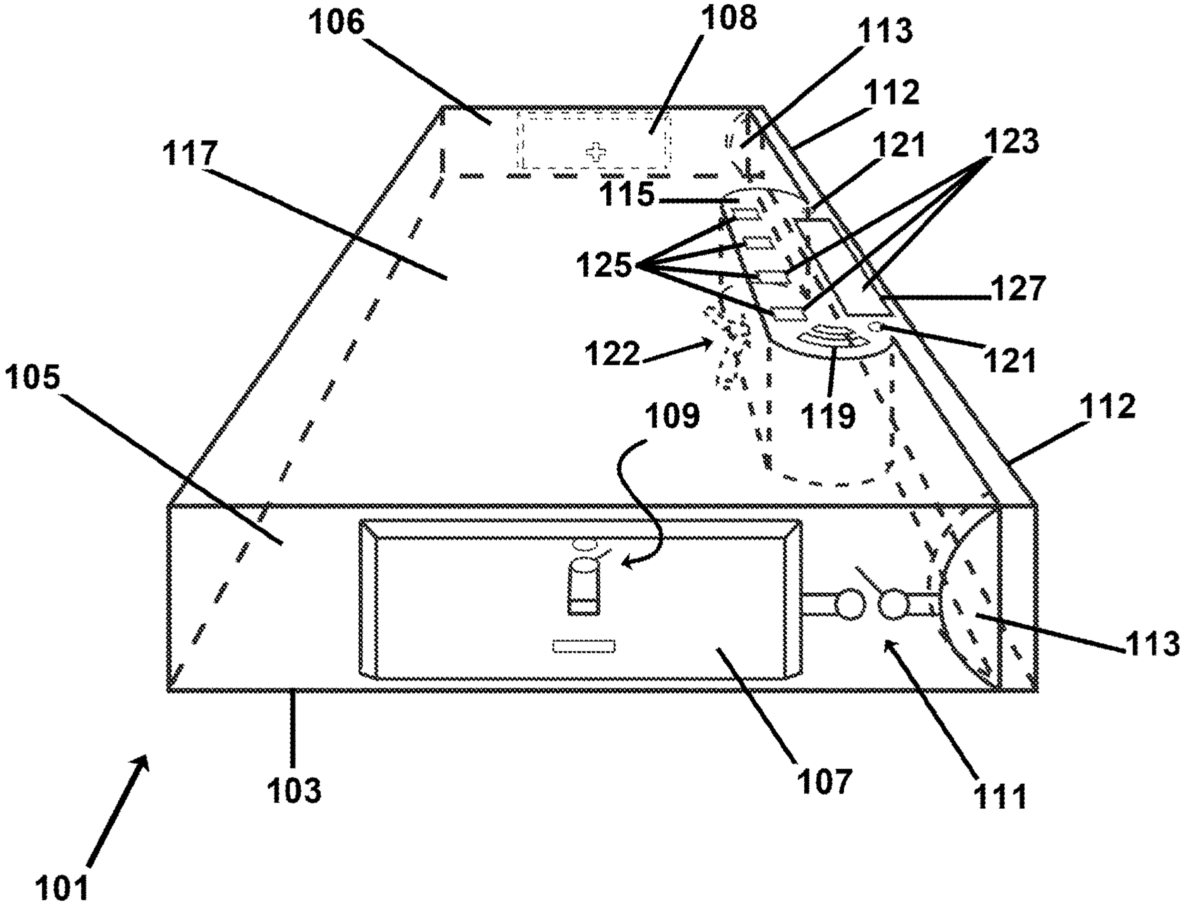
FIG. 1 is a perspective view of an exemplary specialized battery cell, comprising an electrical characteristics- and delivery-adjustable system, in accordance with aspects of the present invention.

FIG. 1 is a perspective view of an exemplary specialized battery cell 101, comprising an electrical characteristics and delivery-adjusting system, in accordance with aspects of the present invention. The outer housing 103 of cell 101 is generally a rectangular box with narrowest sides 105 and 106, each of which incorporates an electrical terminal contact 107 and 108, respectively. Negative electrical terminal contact 107 (closest to the viewer, in the perspective of the drawing) may be variably coupled with, and therefore allow the conduction of electricity from, anode material contained within cell 101, via a system- and/or user-controllable switch 109. Another switch, 111, which also is user- or system-controllable, variably bridges electrical conduction between the negative terminal contact 107 and an electrically conductive lead 112 and auxiliary electrical conduction or communications contact/port 113 to and from a battery control system 115 and/or its control system actuable and connectable components, which the control system may, among other things, connect and disconnect from leads 112 and contact port 113 via switching hardware, such as a switchable power bus, microcontroller, transistors or conventional system-actuable electrical switches.

Among other aspects, battery control system 115 may control, for example, via switches 111 and 109, variable conduction paths for electricity, and may control the partial or otherwise conditioned or augmented transmission of electricity and other communications from or through the battery cell 101. In addition, in some aspects of the invention, control system 115 itself may act as a power source, in addition to another power source and/or as an alternative to such other power source, by, for example, supplementing or mimicking the electrical performance of a battery cell, as the system and/or user determines necessary. For example, system 115 may comprise a DC-DC converter, transformer, capacitor bank, variable-size or reaction profile electrolyte and electrode interface, an auxiliary battery, capacitor bank or other storage (such as an H.P.A.S., as discussed below), separately activated and ordered electrode sections or other electrical power, characteristics or capabilities alteration, storage and delivery hardware along with a microcontroller, or other computer or other control system. An exemplary control system is described with reference to FIG. 13, below. But control system 115 may take on a wide variety of alternative, additional forms, carried out by a wide range of possible programming, to carry out the various aspects of the invention described in this application.

Control system 115 is housed in a section within cell 101 with a space-optimized shape and configuration, to allow an optimal distribution of necessary control system components, while ceding remaining space within cell 101 to the space requirements of other battery cell components, such as, but not limited to, anode material, cathode material, wet or dry electrolyte, separator material, leads and sensors (which components are not individually pictured), within a main power storage section 117.

The contents and variable electrical pathways described herein may be housed and insulated from one another and the environment via separating and insulating housings and/or other materials. For example, control system 115 and leads 112 may be enclosed within an electrically-insulating housing material. However, that housing material preferably also comprises slats 119, or other cooling and variable pressure release aspects, which may provide convection cooling airflow or other fluid exits. Control system 115 may also include user interface ("GUI") controls 121 and display hardware 123, such as LEDs 125 and/or an LCD pixel display 127, such that a user may issue various commands to, and receive feedback from, the system, for example, to carry out the various steps described in this application for a control system and/or battery management devices and systems.

For example, and as amplified in greater detail below with reference to process flow diagrams, exemplary cell 101 may, in some configurations with neighboring cells, create and exert an electrical potential matching a nominal voltage of conventional battery, or, in a similar manner to conventional battery cells, of a voltage varying during discharge. To that end, in some additional exemplary embodiments, also discussed in greater detail below, cell 101 may also take on a function and form similar to or compatible with complementary receptacles and bays designed for existing battery cell types. In such instances, anode and cathode material connected to contacts 108 and 109 and electrolyte and other components held in main power storage section 117 may generate and deliver a voltage and charge current and internal resistance at least in part by conventional means, which may, when cell 101 is properly charged, meet or exceed the performance requirements of such battery cell types and cell 101 may be placed, for example, in series with other cells of such battery cell types (although, in other instances, cell 101 may be installed in connection with cells of its own type). Under some circumstances, however, power capabilities and other characteristics and delivery thereof by control system 115 may be introduced, increased, decreased, or otherwise varied or arrested, in instances or according to patterns and periods, for example, by use of switch 111, depending on the optimal benefit of the circuit and larger battery system of which cell 101 may be a part, which actions and benefits will be discussed in greater detail below. Although switch 111 is shown as a binary switch, it should be understood that a wide variety of alternative switches, switch arrays and conductance variation hardware may, alternatively or in addition, be used. Thus, in some control states, control system 115 may partially supply a necessary voltage from its own internal hardware, or even supply all power delivered from cell 101 from that hardware, while breaking or reducing conduction from main power storage section 117, for example, by switch 109 which, as with switch 111, may take on a wide variety of alternative switch and conductance-varying hardware forms. To facilitate providing variable power, power capabilities, voltage and other electronic characteristics and capabilities, as a supplementation or replacement of power or other capabilities or characteristics from main power storage section 117, independent electrical connections 122 to anode and cathode material within storage section 117, or within an ancillary power storage system, may be provided. Connections 122 may comprise a variable interface or profile, altering the amount or number of separately insulated sections of electrochemical reagents physically available and applied for immediate reaction and/or available overall for reaction to create electrochemical power for the system 101. For example, a control system may variably access and engage otherwise isolated sections of electrode and/or electrolyte material via switching, as discussed, for example, with reference to FIGS. 11, 14 and 15, below. Alternatively, electrical connections 122 and attached anode and cathode material may be variably extended into electrolyte material (for example, by a servo/motor or actuator controlled by system 115), increasing or decreasing its reacting profile and volume, over particular periods, creating differing conduction, virtual voltages, resistance and capacities. If system-variable electrolytic repair materials or energy are used, as discussed in greater detail below, the implementation of such repair materials may also be selectably decreased or increased to alter the electrical capabilities and characteristics of system 101, as needed to optimize power delivery to an electrical circuit of which it is a part.

Using such an auxiliary source of potential, cell 101 is able to "dial-in" a variety of differing and/or supplemental power capabilities, power, voltages or other electrical circuit characteristics or capabilities for the circuit of which it is a part, as may be variably selected by the control system 115 and/or a user. As mentioned above, control system 115 may include a system-variable DC-DC converter, transformer, capacitor bank, variable-size or reaction profile electrolyte and electrode interface, separately activating electrode and electrolyte sections or other electrical power, capabilities or characteristics alteration, storage and delivery hardware. In addition, current may run through control system 115, for example, by use of two-way, switchable leads within leads 112 (variably placing system 115 in series with the remainder of cell 101 and other elements of a larger circuit) or through other electrical connections (not pictured) which may, in some embodiments, be variably engaged with anode and cathode material within main power storage 117, in addition to varying system 115's performance and capabilities, as discussed above. As a result, control system 115 may, in a preferred embodiment, convert and "dial in" different levels of power, overall power capabilities, voltage, and other electrical characteristics and capabilities delivered from cell 101 through connections 107, 108 and/or 113, as variably selectable by the system and/or user. In addition, control system 115 may include a voltage tester, charge tester or communications hardware for assessing voltage and charge conditions of cell 101, neighboring or fellow series cells, other power sources, or a larger circuit as a whole. By assessing its own cell (cell 101, or section 117) charge state and other relevant conditions, and comparing it to that of neighboring cells, cell 101 may selectably deliver increased or decreased power, voltage, or other capabilities or characteristics, or may be bypassed or partially bypassed or share in current flowing through it, as will be explained in greater detail below, with reference to additional exemplary figures.

The specific embodiments set forth above are preferred, but not exhaustive of the many different structures, devices and methods that fall within the scope of the invention. For example, as discussed in further detail below, in some embodiments, control system 115 may also or alternatively comprise power- or other characteristics- or capabilities-conditioning, -limiting, -filtering, -protecting and other hardware which may affect a wide variety of electronic circuit and battery performance characteristics, in addition to raising and lowering characteristics and capabilities and executing bypass or partial bypass operations. In other embodiments, circuit selection and main power storage section bypassing capabilities may be more limited, or removed, while power conditioning and voltage- and power-dialing and -export capabilities may be retained, for example.

Figure 2:
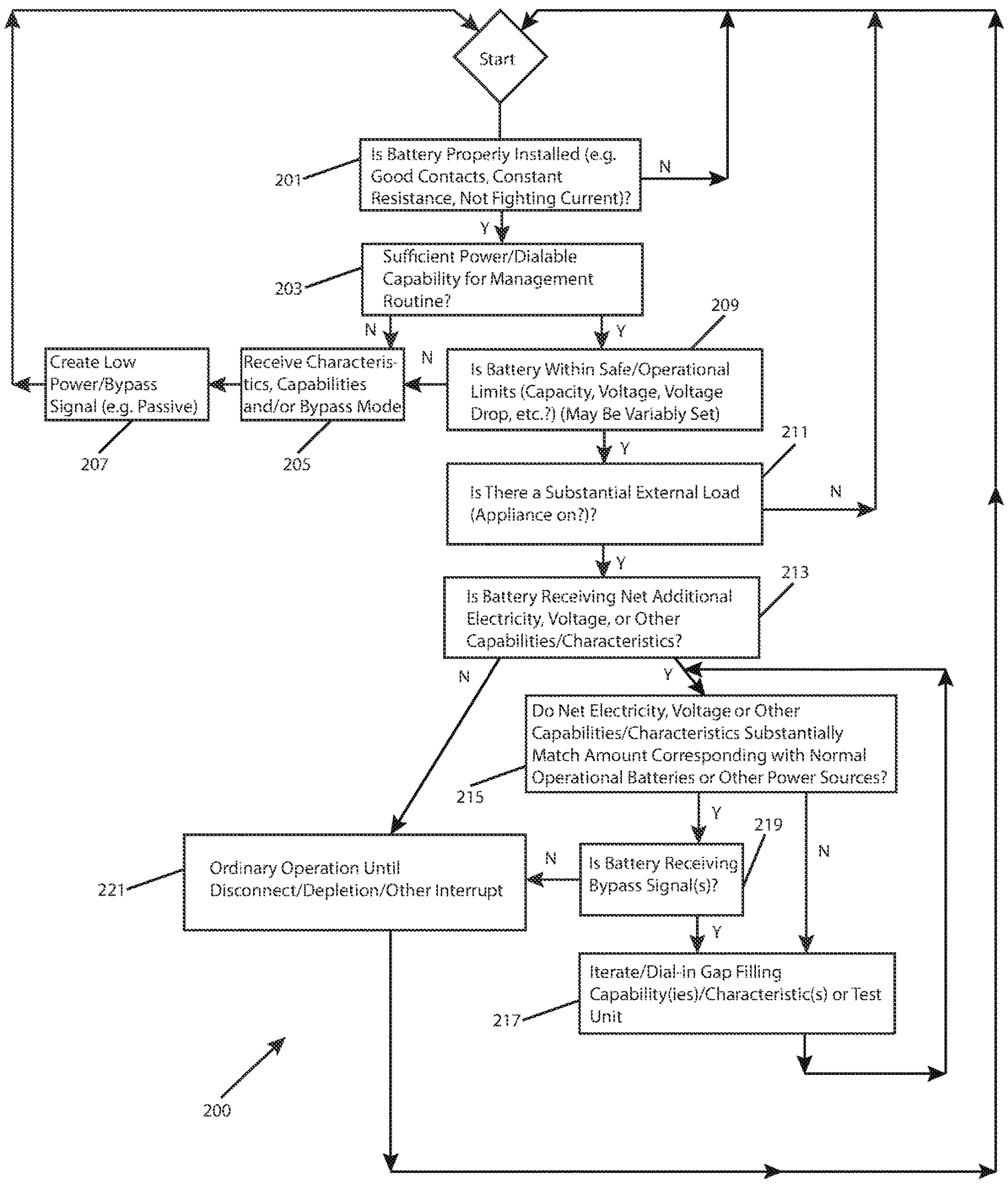
FIG. 2 is an exemplary process flow diagram of exemplary steps that may be taken by a system, such as (but not limited to) a hardware and software control system such as that discussed with reference to FIG. 13, below, implementing local monitoring and control aspects of the present invention in the context of a battery cell system, an example of which is described above, with respect to FIG. 1.

FIG. 2 is an exemplary process flow diagram of exemplary steps 200 that may be taken by a system, such as (but not limited to) a hardware and software control system such as that discussed with reference to FIG. 13, below, implementing local monitoring and control aspects of the present invention in the context of a battery cell system, an example of which is described above, with respect to FIG. 1.

Figure 3:
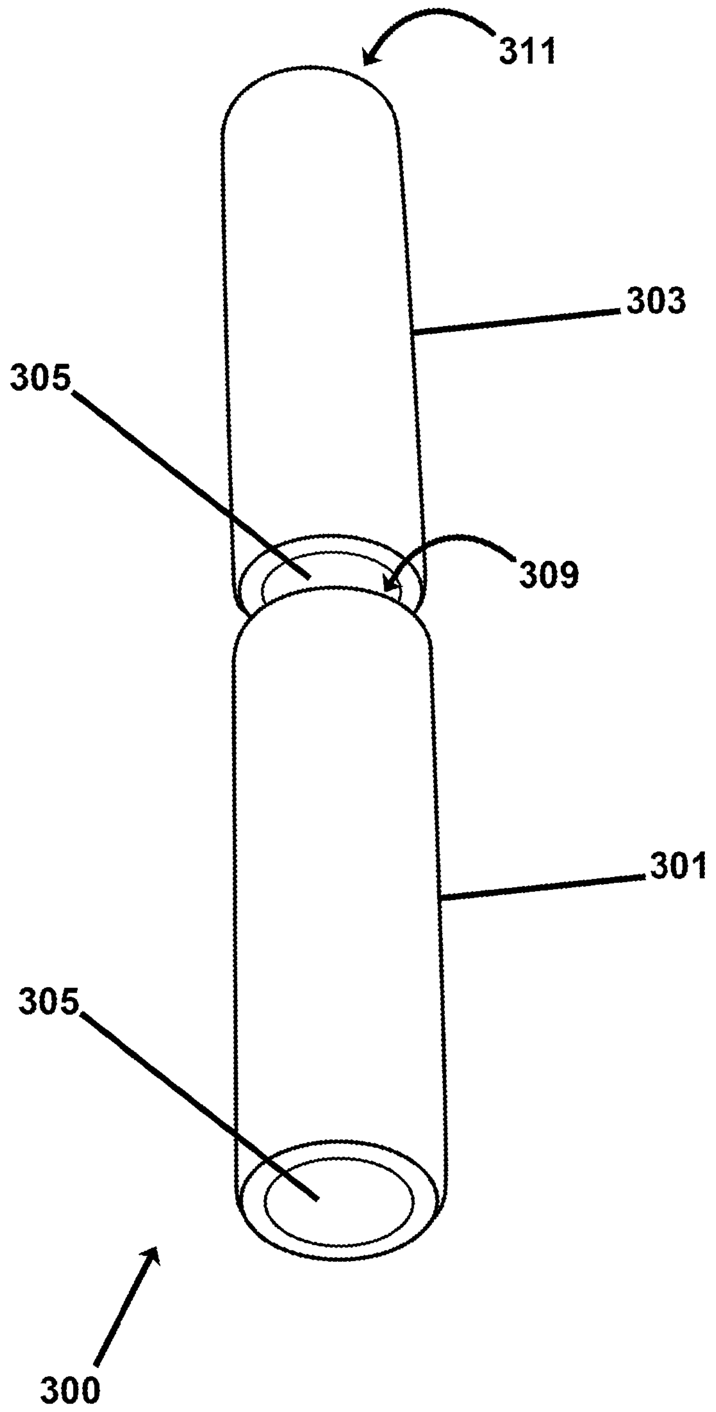
FIG. 3 is a perspective drawing depicting an exemplary pair of battery cells in electrical contact with one another and placed in a series configuration for connection in series in an electrical circuit, which exemplary pair will serve as a platform for discussing further embodiments of the present invention, with reference to subsequent figures.

FIG. 3 depicts an exemplary pair 300 of battery cells, cell 301 and cell 303, in electrical contact with one another and placed in a series configuration for connection in series in an electrical circuit. This exemplary pair of cells serves as a platform for discussing further embodiments of the present invention, with reference to subsequent figures.

Each cell 301 and 303 is generally cylindrical in shape, as is the case, for example, with American National Standard Institute size C, D, AA, AAA and AAAA batteries. As with other battery cells, each cell 301 and 303 has a negative terminal—305 and 307, respectively—electrically connected to anode material and able to deliver a flow of electrons to a conductor within a circuit, under some circumstances. Each cell also comprises a positive terminal (not expressly pictured in the perspective of the figure, but which are present on the ends of the cylindrical cells opposite the negative terminals, as demonstrated by arrows 309 and 311), connected to cathode material within the cell, which is able to draw and receive a flow of electrons from a conductor placed in contact with it in a circuit, under some circumstances. As with most battery cells, cells 301 and 303 are able to deliver a relatively steady current and power to an electrical appliance, generally within manufacturing tolerances and accuracy limitations and subject to alteration during discharge and over the life of the cells. However, also as with most battery cells of the same or a similar type, cells 301 and 303 will have important differences in capacity, charge, internal resistance, and other characteristics, due to those same tolerances and limitations and ordinary variations in assembly, wear and tear, and charge or charge cycling. If rechargeable, differences in such characteristics may become much more pronounced over several charge cycles.

Figure 4:
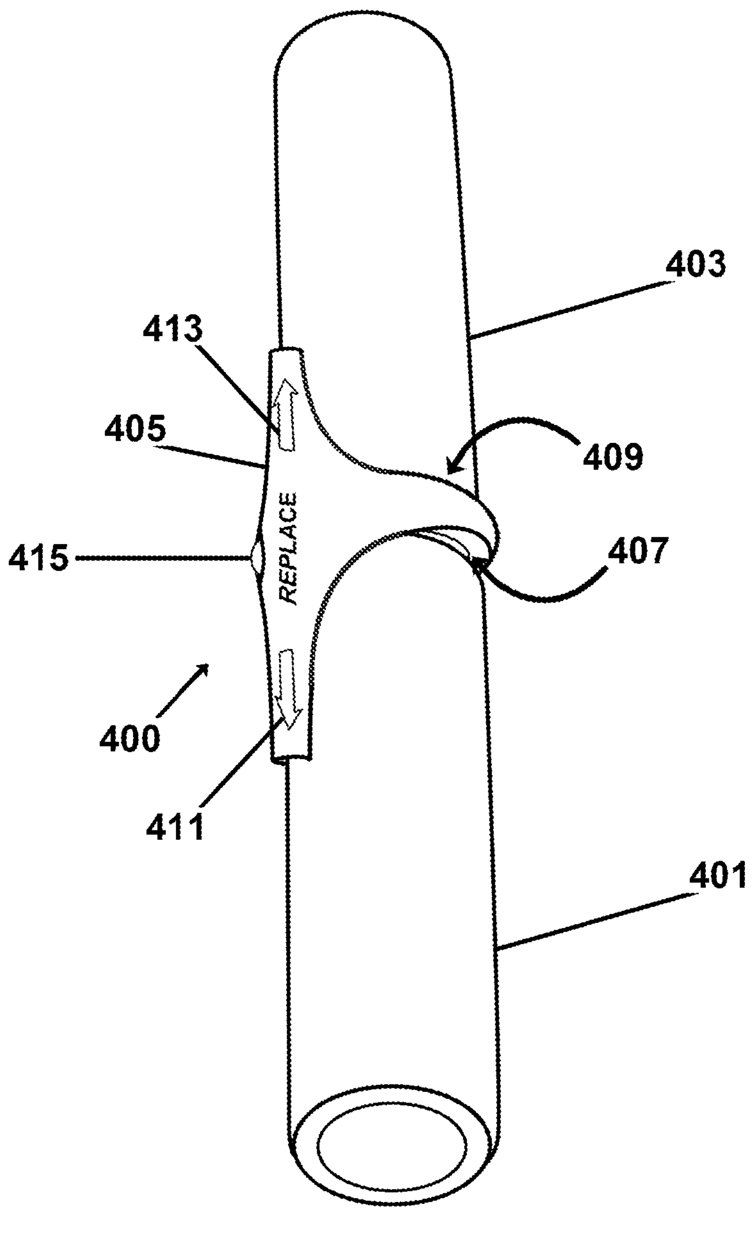
FIG. 4 depicts an exemplary variable-degree battery-substituting and circuit-optimizing insertable device system, with a complimentary form factor for installation between a pair of battery cells placed in series, as also shown in the same perspective as that provided in FIG. 3.

FIG. 4 depicts an exemplary variable-degree battery-substituting and circuit characteristics-optimizing insertable device system 400, with a complimentary form factor for installation between a pair of battery cells placed in series (401 and 403), as also shown. As with the exemplary battery cell device discussed with reference to FIGS. 1 and 2, the system 400 may comprise a control system (not separately pictured) held within a housing, 405. And, also similarly, system 400 may deliver variable auxiliary power or other electrical capabilities or characteristics to a circuit with which it is engaged, through negative and positive contacts, 407 and 409, respectively, which also may be variably connected (connected or disconnected, and so connected or disconnected to different degrees, at different times and/or for different durations) to anode and cathode material within system housing 405, as variably and continuously adjustable and/or otherwise controllable by the control system with the use of switches, or other variable activation and conduction devices, which are similarly virtually unlimited in terms of the number of possible forms. More specifically, when system 400 is properly installed between two battery cells placed in a series circuit (not all of such circuit is pictured, for simplicity) negative system contact 407 makes contact with, and allows electrical conduction with, a positive contact of one battery cell (401) while positive system contact 409 makes contact with, and allows electrical conduction with, a negative contact of another battery cell. In some alternative embodiments, however, system 400 may be inserted and installed between additional or fewer such cells, and may instead make electrical contact, at least in part, with corresponding conductive contacts of another part of an electrical circuit.

As will be explained in greater detail below, in FIG. 5, system 200 may variably, and to differing degrees, conduct electricity between cells and/or through the electrical circuit. It may also, as with the battery cell discussed in reference to FIGS. 1 and 2, include a supplementary, chargeable battery or other auxiliary power source, such as a secondary battery, capacitor or capacitor bank, among other possibilities, which may be variably applied by the control system and/or user. Also as with the control system discussed with reference to FIGS. 1 and 2, system 400 may variably supply a number of electrical circuit characteristics, depending on local readings from voltage, current and/or other electrical characteristics sensors. For example, system 400 may be variably charged, for example, using power from battery cells in connection with it, for such supplementation, and supply variable supplemental voltages, power, power capabilities, and/or other electrical capabilities or characteristics to the larger circuit of which it is a part with the aid of a contained transformer, DC-DC converter, buck booster, coil, or other electrical characteristic converter, variable electrolyte/electrode section engagement and/or reaction and application hardware, such as, but not limited to, the electrical characteristics and capabilities adjusting hardware discussed above, in reference to FIGS. 1 and 2.

In addition, system 400 may utilize voltage, current, temperature measurements or other capacity or battery aspect (or aspect-indicating condition) communicating and/or sensing hardware to determine lagging, undercharged, failing or other critical conditions of neighboring cells and, if warranted, actuate indicators, such as directional replacement indicators 411 and 413, to alert a user that a particular cell requires replacement with a cell in a better condition. For example, in some embodiments, a user may actuate a user interface, such as that pictured as user interface button 415, which then may lead the system to determine and indicate whether such critical conditions are present in a neighboring cell installed above (such as 403, in which case indicator 413 may turn on) or below (such as 401, in which case indicator 411 may turn on), when either cell is sensed to be in such a critical condition, or in certain other condition types warranting action by a user (e.g., cell replacement). For example, in some embodiments, a signal from either cell may indicate whether it is in such a condition, and identify its location relative to the system 400. Alternatively, system 400 may detect directional voltage drops, for example, prior to and after engagement with other load(s) in the circuit, to determine the location and/or identity of the cell(s) with the condition. In other embodiments, system 400 may issue a signal keyed for erosion or other alteration by the perceived condition, at strengths that will lead to different levels of erosion depending on when the signal arrives at the cell with the condition (near or far side of the load) and, based on the degree of erosion upon arrival, deduce the identity and/or location of the cell with the condition. For example, if overheating is perceived, the direction of the overheating can be deduced by directional sensors, or a heat-affected, conducted signal may be issued and strength after passing through the load, along with a range of possible cell heats and their differing impact on signal conduction before or after passing through the load (e.g., due to the different characteristics of the signal at those different stages), may allow the system to deduce the cell's location and/or identity.

Figure 5:
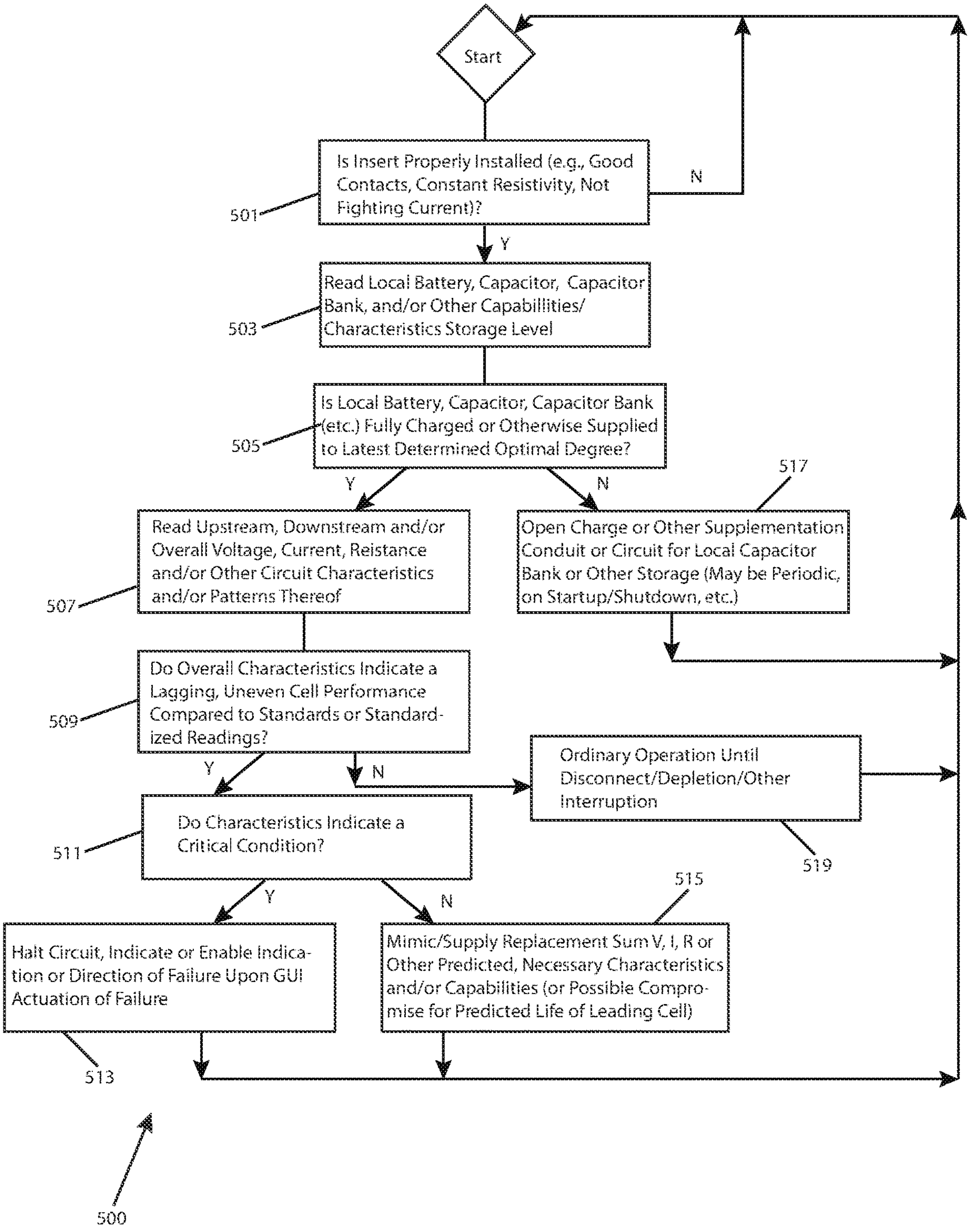
FIG. 5 is an exemplary process flow diagram of exemplary steps that may be taken by a system, such as (but not limited to) a hardware and software control system of the nature discussed with reference to FIG. 13, comprised in a battery-substituting and circuit-optimizing insertable system, such as the system discussed with reference to FIG. 4, above.

FIG. 5 is an exemplary process flow diagram of exemplary steps 500 that may be taken by a system, such as (but not limited to) a hardware and software control system of the nature discussed with reference to FIG. 13, below, comprised in a battery-mimicking and circuit-optimizing insertable system, such as the system discussed with reference to FIG. 4, above.

Figure 6:
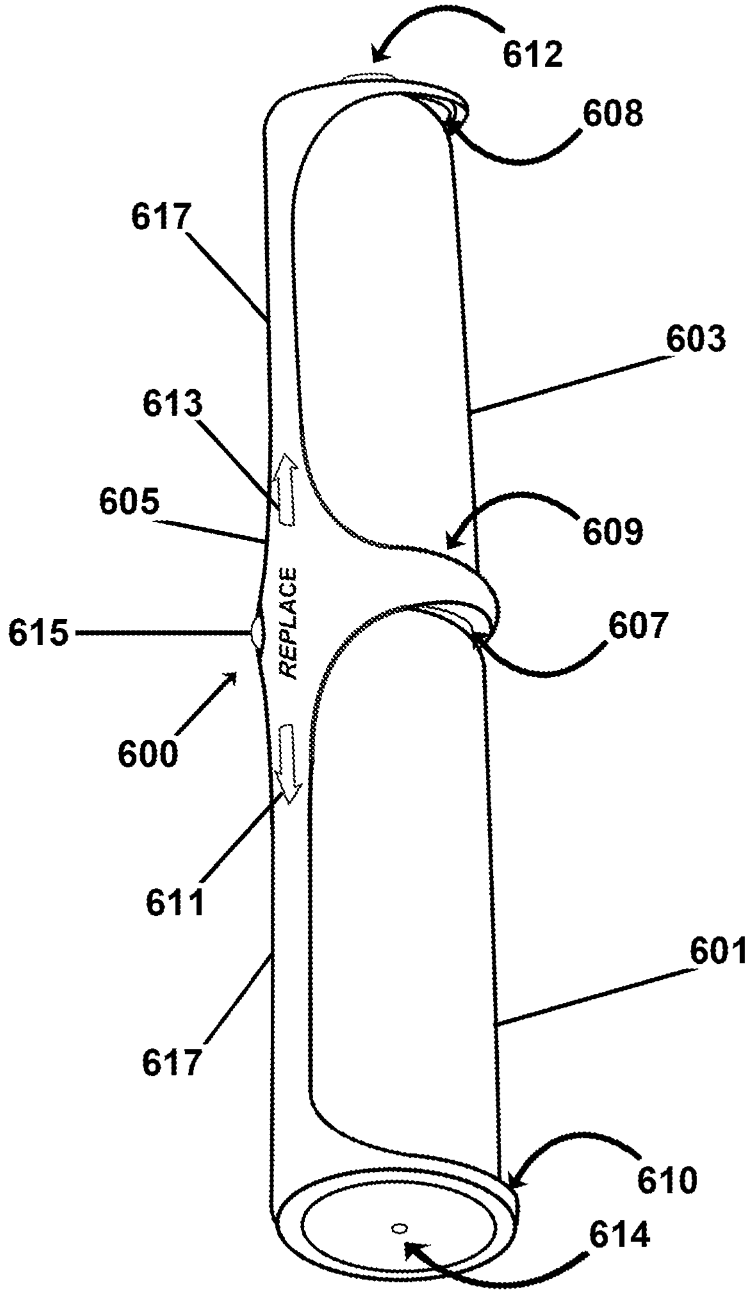
FIG. 6 depicts an exemplary variable-degree battery-substituting and circuit-optimizing insertable device system, with a complimentary form factor for installation between and around a pair of battery cells placed in series, as also shown in the same perspective as that provided in FIGS. 3 and 4.

FIG. 6 depicts an exemplary variable-degree battery-substituting and circuit-optimizing insertable/wraparound device system 600, with a complimentary form factor for installation between and around a pair of battery cells placed in series and within an appliance battery case (not pictured) designed to accept such a pair of batteries.

Figure 7:
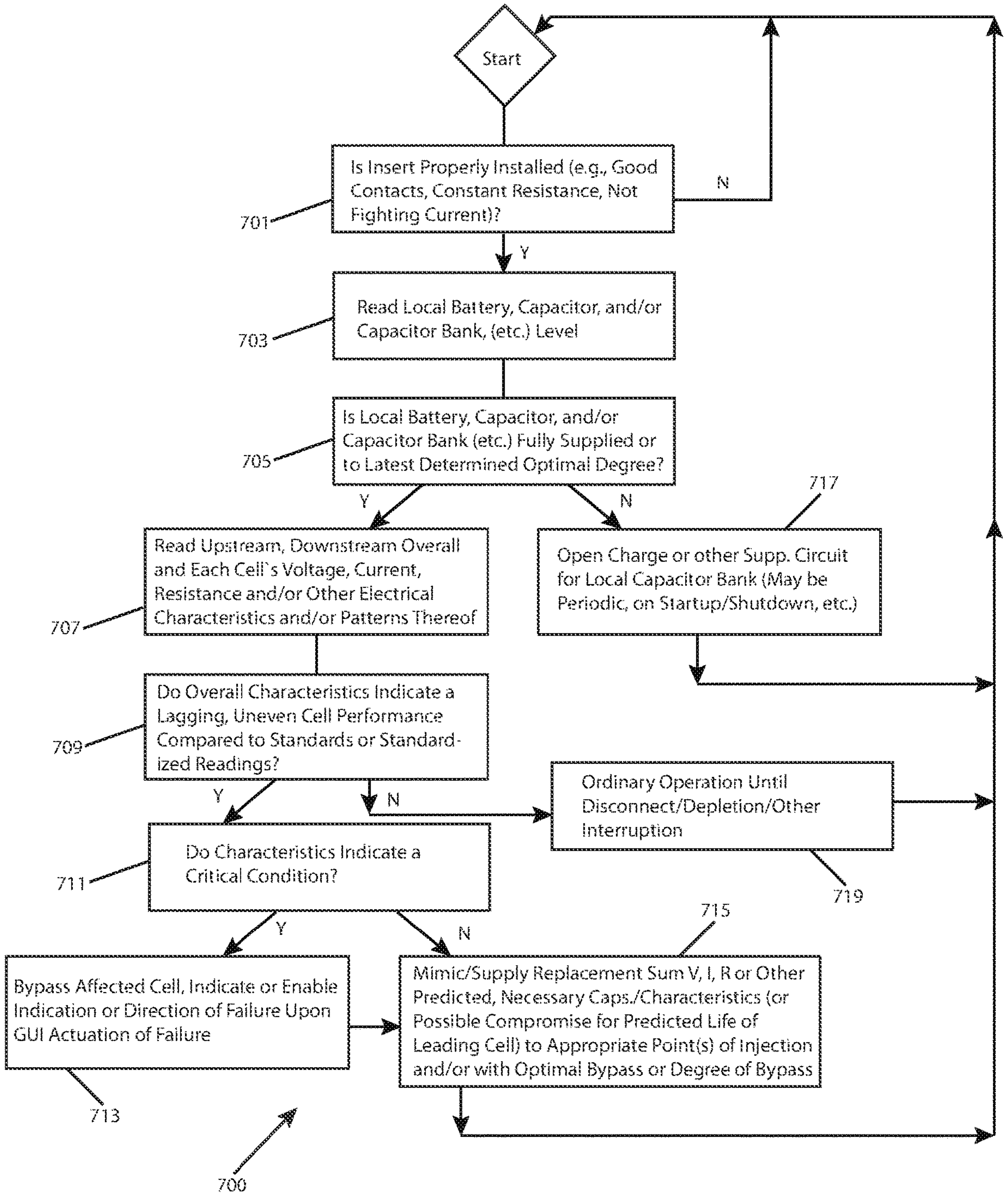
FIG. 7 is an exemplary process flow diagram of exemplary steps that may be taken by a system, such as (but not limited to) a hardware and software control system of the nature discussed with reference to FIG. 13, comprised in a battery-substituting and circuit-optimizing wrap-around and insertion system, such as the system discussed with reference to FIG. 4, above.

FIG. 7 is an exemplary process flow diagram of exemplary steps 700 that may be taken by a system, such as (but not limited to) a hardware and software control system of the nature discussed with reference to FIG. 13, comprised in a battery-substituting and circuit-optimizing wrap-around and insertion system, such as the system discussed with reference to FIG. 6, above.

Figure 8:
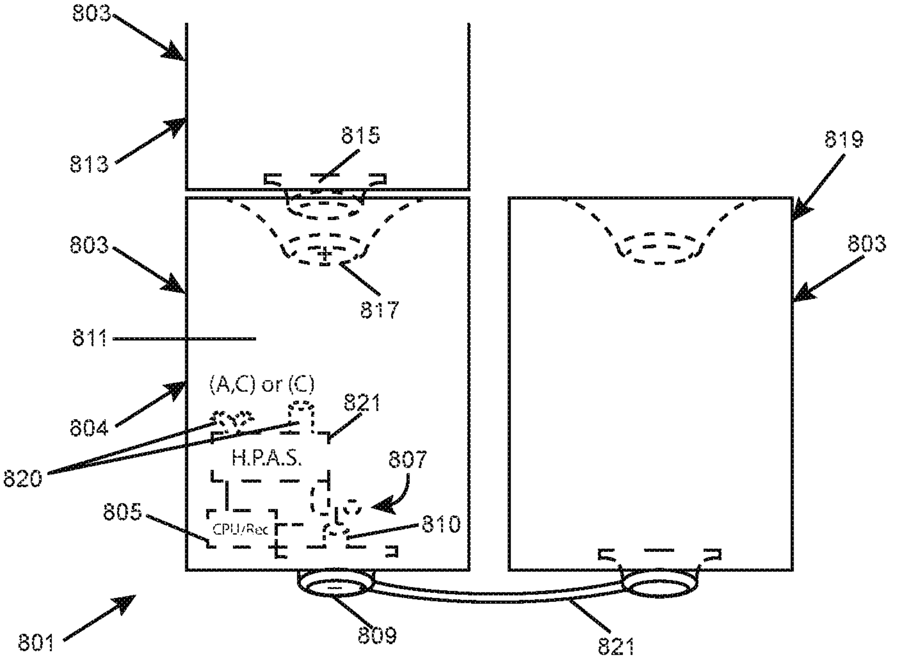
FIG. 8 is a top view of parts of an exemplary battery cell complex, comprising supplementary power addressing, sending and receiving hardware, in accordance with aspects of the present invention.

FIG. 8 is a top view of parts of an exemplary battery cell complex 801, comprising supplementary power and/or other electrical capabilities or characteristics addressing, sending and receiving hardware, in accordance with aspects of the present invention. System 801 may comprise individual battery cells 803, which may comprise various controllable hardware and at least one control system 805 (pictured within an exemplary cell 804 in the embodiment shown) for controlling that hardware. Among other things, control system 805 may variably actuate a switching or other variable conducting and/or communication selection complex 807, which may variably send power (or other characteristics or capabilities, if conductable or deliverable) and current through a multiple-use negative contact 809. Control system 805 may, under certain circumstances (examples of which are discussed in greater detail with reference to FIG. 9, below) cause conducting/communicating complex 807 to: (A) conduct charge, voltage, current or other electronic characteristics from anode material in a main cell storage section 811 through a switchable connection 810 and to a negative contact 809; (B) conduct charge, voltage, current or other electronic characteristics from a high-powered auxiliary storage ("H.P.A.S.") device 821 through the same switchable connection 810 and to negative contact 809, which also has Anode and Cathode connectors, shown as 820; (C) conduct pulses or other units comprising part of such characteristics through connection 810 and negative contact 809; and/or (D) introduce a leading electronic code through the same selectable conduction pathway(s), and away to other connected or otherwise networked cells, to dictate the further management of such characteristics or part(s) of such characteristics at intermediate or final destination points—for example, directing management by control system-managed hardware within such other cells.

Main storage area 811 may receive similar characteristics or codes from other, neighboring, electrically connected cells, such as cell 813, from its negative contact 815, and internal hardware (similar to the hardware discussed above, with reference to cell 801) and an identical or similar control system which may also be present in such neighboring cells (not separately pictured). When such characteristics or codes are so delivered, they may flow through a complementary positive contact, 817, within cell 801, coupled with and able to conduct such characteristics from negative contact 815. Depending on the placement and electrical connections joining two such neighboring cells (for example, if they are side-by-side, in a parallel circuit configuration, as may be the case with cell 801's relationship with another, parallel cell 819), a bridging contact between the communicating negative terminal of one cell and positive terminal of another cell (such as bridging contact 821) may also be used to conduct such characteristics and/or codes.

Depending on the nature of the codes and characteristics transmitted from one cell to another (which may pass through intermediate cells), the internal hardware receiving such codes or characteristics may permit such characteristics to pass through or bypass a main storage section (such as 811) or other internal hardware and on to other cells or an appliance through a negative contact, instead terminate or temporarily terminate such transmission through or bypassing the main storage section and other internal hardware and use such characteristics to charge or otherwise supply the main storage section, with the aid of its control system (such as 805) and/or H.P.A.S., or charge the H.P.A.S. itself, either of which may therefore take in at least some of the characteristic(s) stored and no longer transmitted. All of these actions may be triggered by the control system actuating timed switching of its variable conducting and/or communication selection complex (such as 807). In some embodiments, a separate conducting path (not pictured) between the negative and positive terminals of a cell, electrically separate from main storage section 811, may also be activated by switching and may transmit or retransmit such received characteristics and codes, as directed by a control system, and therefore ameliorate the effect of internal resistance on the re-transmission of externally-addressed power. To aid each system in determining which action to take (transmission or intra-cellular use), each cell may have its own unique coding, and each cell may communicate with other cells' control systems, or with a master control system, to indicate its electrical characteristics supplementation needs or capabilities, and lead other cells to produce, transmit and receive needed characteristics to achieve properly balanced series or other arrangements of cells, or the effect of the properly balanced arrangements. Upon so successfully transmitting such characteristics and codes, in response, receiving and intermediate cells then also behave as discussed above.

A more complete exemplary process flow for such a variable management and delivery of such code-addressable electrical characteristics is provided in greater detail below, in reference to FIG. 9. An exemplary control system, which may be used as control system/C.P.U./transmission unit 805 is described with reference to FIG. 13, below.

Figure 9:
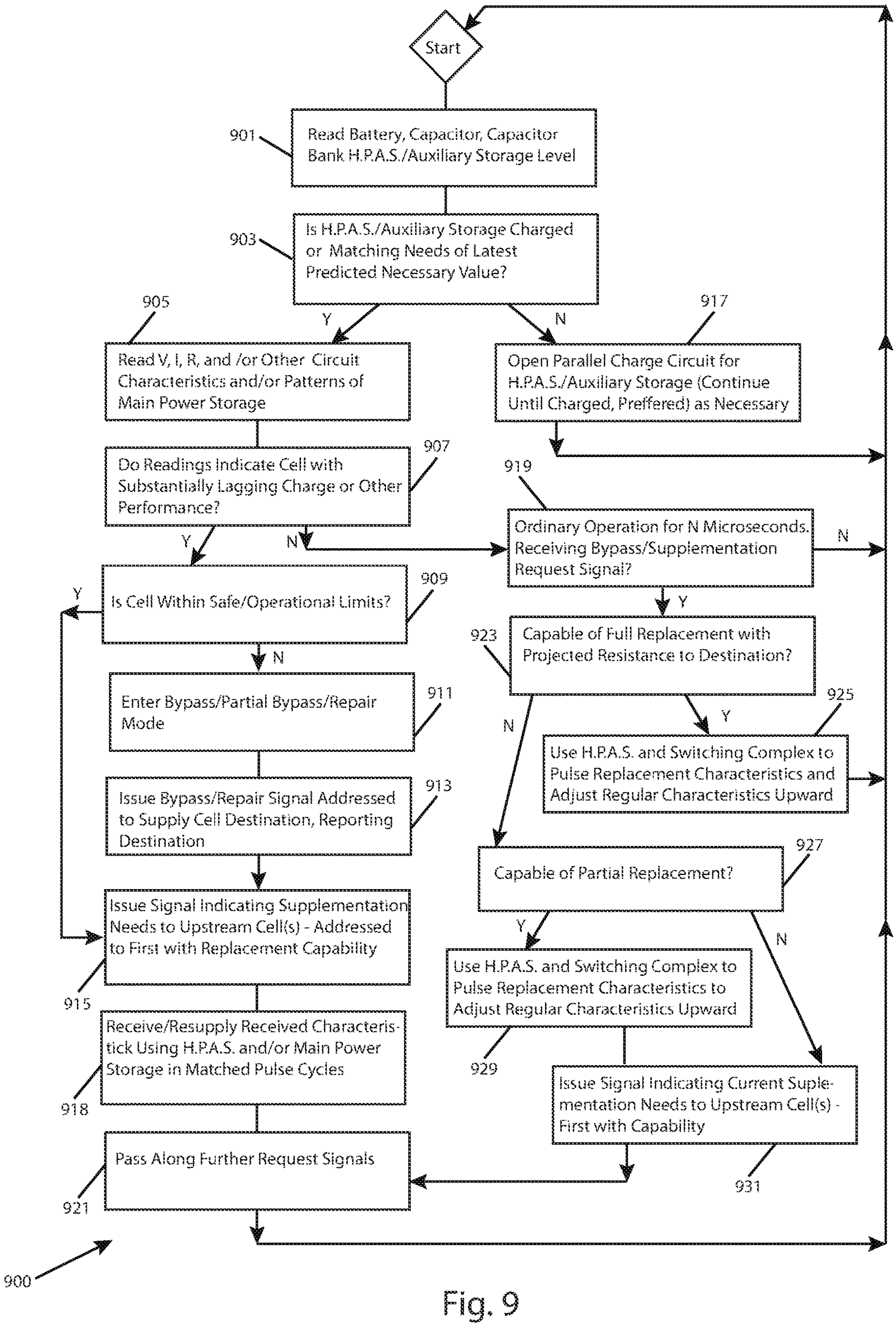
FIG. 9 is an exemplary process flow diagram of exemplary steps that may be taken by a system, such as (but not limited to) a hardware and software control system of the nature discussed with reference to FIG. 13, comprised in a battery cell complex system, such as the system discussed with reference to FIG. 8, above.

FIG. 9 is an exemplary process flow diagram of exemplary steps 900 that may be taken by a system, such as (but not limited to) a hardware and software control system of the nature discussed with reference to FIG. 13, comprised in a battery cell complex system, such as the system discussed with reference to FIG. 8, above.

Once again, the embodiments discussed with reference to the figures are illustrative only, and do not exhaust the many possibilities that fall within the scope of the invention. In some embodiments, for example, separate terminals and connections may be implemented for addressing and exporting electrical characteristics simultaneously with ordinary power delivery from and to cells, rather than common terminals used at different times for ordinary power delivery and the export of such characteristics. However, the shared terminals and other pathways set forth above are preferred because they greatly lower manufacturing costs and allow for sharing more robust connections.

Figure 10:
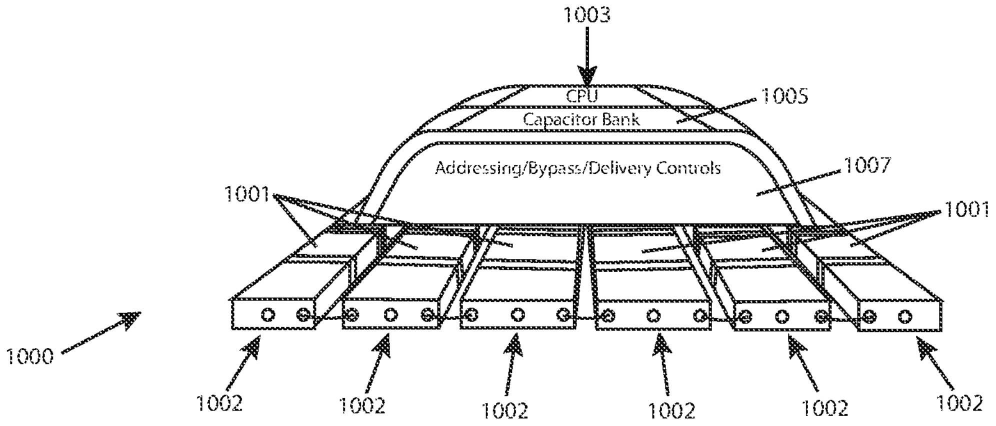
FIG. 10 is a perspective drawing depicting an exemplary complex of battery cells, arranged in several rows of such cells placed in series, and comprising an overarching control system, auxiliary power storage, and variable cell-addressing, -bypassing and "hot-swapping" hardware, in accordance with aspects of the present invention.

FIG. 10 is a perspective drawing depicting an exemplary complex 1000 of battery cells (examples of which are shown as 1001), arranged in several rows 1002 of such cells placed in series, and comprising an overarching control system 1003, auxiliary power storage 1005, and variable cell-addressing, -bypassing and "hot-swapping" hardware, in accordance with aspects of the present invention. "Hot-swapping" generally refers to aspects of the invention where a control system may, while substantially maintaining an active circuit with a current, conductively isolate at least one cell, or an electrical characteristic(s) or capability(ies)—generating part or reagent thereof, from a position where it has, or may have, been delivering power at least partially in the circuit and/or introduce, also while maintaining a substantially active circuit with current, at least one battery cell or an electrical characteristic(s) or capability(ies)—generating part or reagent thereof, into a circuit, for the purpose of optimizing, equalizing or otherwise improving or selecting the distribution of voltage, charge, current, resistance, power and/or other electrical characteristics of a circuit.

In some preferred embodiments, a control system, such as control system 1003, more specific examples for which are provided below, in reference to FIG. 13, controls an array of separable conductors for positive and negative terminals of each cell 1001, for example, with the use of a variable switching hardware 1007, and may further operate variable conduction, auxiliary storage, electrode and/or electrolyte reaction-controlling-, or other hardware, such as the hardware types and examples set forth elsewhere in this application. Using variable switching hardware 1007, or such other conduction and conduction path changing hardware, control system 1003 may place any cell, or aspect or part of any cell (e.g., sections of electrode material, as in embodiments discussed below), in terms of electrical conduction or characteristic(s) or capability(ies), in any order (for example, series or parallel, or partially series or parallel) circuit arrangements with any other cell(s) in common circuits, and remove any cell or electrical characteristic, capability, aspect or part (e.g., sections of electrode material, as in embodiments discussed below) thereof from any order with any other cells in common circuits. To select optimal orders, the control system 1003 may first test the capacity, charge state, voltage, temperature, internal resistance and efficiency during power transmission or generation, or any other electrical or performance characteristic, capability or aspect relevant to each or any battery cell's, or aspect thereof's, state and capabilities, and may assess potential states and capabilities of any battery cell or aspect thereof across a projected charge or discharge curve, and in multiple activity scenarios with or without partial bypass and with or without electrolyte or electrode section or other electrochemical reagent actuation. The system may then compare the projected possible outcomes and select an optimized, most efficient projected arrangement among the possibilities set forth above, and with an assessment of the likely load(s) or other duties to be encountered by the system, which may be informed by present and prior historical use of the system, a cell or a part thereof as well as templates or other indicators of patterns for such use. The system may also, or alternatively, assess such characteristics of an entire series of battery cells or parts thereof, or each such series group of battery cells or parts thereof, and compare it/them to ideal levels for application to an appliance and/or to other series of battery cells. Based on those results, the control system may rearrange individual, several and/or groups of battery cells, or aspects or parts thereof, placing them in new series or other common circuits to better optimize each series, and or bypass or partially bypass or otherwise isolate or retract from reaction at least one cell, reagent, reagent section, or other part or aspect of a cell, to obtain ideal, equal, matched or otherwise better characteristics and/or average or blended characteristics in each newly created series. In some embodiments, the system may, through bypassing some cells or parts thereof and regrouping remaining cells or parts thereof, create fewer series, but each with a desired voltage, power output and/or current for servicing the appliance.

In addition, the control system 1003 may use a flexible auxiliary power source, such as that pictured as capacitor bank 1005, which may be charged to a degree determined by the control system to be necessary or optimal in at least some respect in advance of use, during recharging, or during use of the complex 1000 (for example, by ambient power sources and/or from surplus power from any of the cells 1001) or from any other power source accessible for such charging, for a variety of purposes to facilitate the function of the complex 1000. For example, control system 1003 may use the auxiliary power source to address and replace cells or parts thereof with critical conditions, or fill gaps in power delivery resulting from hot-swapping, balance cells, parts or series of cells, and/or repair, recharge and/or replace lagging or bypassed cells, among other possible needs or beneficial uses.

Although, as in other embodiments of the invention set forth above, the embodiments discussed with reference to FIG. 10 may emphasize rows of series-connected battery cells, it is within the scope of the present invention that the electrical characteristics exporting, leading signals and hot-swapping of cells may be carried out with respect to, and create configurations of, cells or parts thereof in any other form of initial or ending circuit or configuration, including parallel, partially parallel and other arrays of battery cells and parts thereof.

Figure 11:
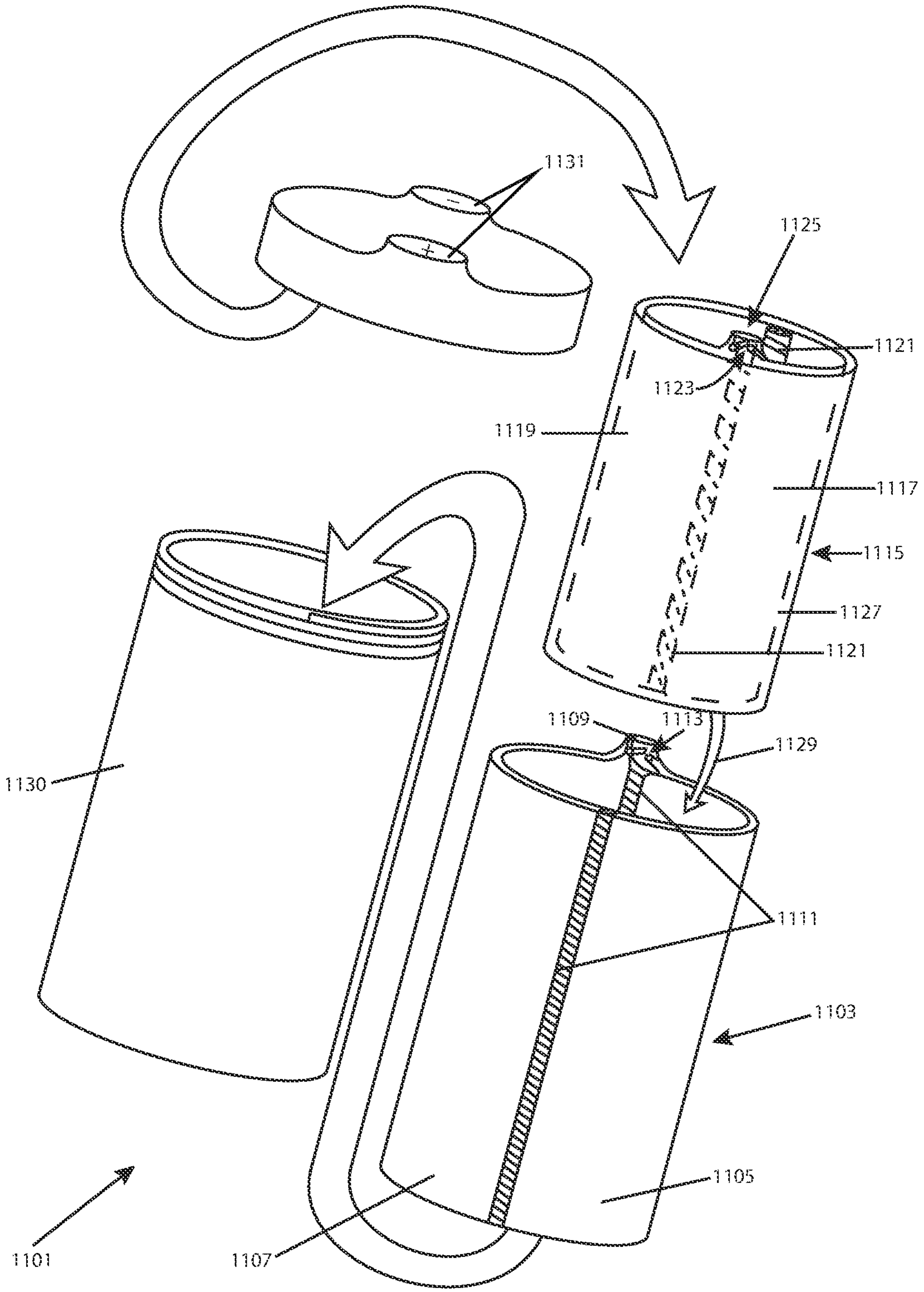
FIG. 11 is a perspective drawing of exemplary parts of a battery cell system with variably-engageable sections of electrode, cathode and electrolyte materials.

FIG. 11 is a perspective drawing of exemplary parts of a battery cell system 1101 with variably-activated, separable sections of electrode, cathode and electrolyte materials. A substantially hollow-cylindrically-shaped major anode material section 1103 is pictured, comprising two exemplary sections, 1105 and 1107, of anode material. Each section, 1105 and 1107, is variably electrically insulated from one another and a charge delivery contact 1109, by virtue of insulation, such as insulation barriers 1111, and a system-variable switch, such as that pictured as 1113. A battery hardware control system may variably actuate switch 1113 to engage more or less electrode material and/or associated electrolyte materials in which it is immersed, in section 1105 to conduct charge to contact 1109. In the example pictured, section 1107, by contrast, is constantly connected with, and conducting charge to, contact 1109. Thus, by variably engaging section 1105 with contact 1109 via switch 1113, a control system is capable of variably adding the increased power delivery capabilities, and the applied capacity, of section 1105 to those of section 1107. As will be explained in greater detail below, by rapidly engaging and disengaging section 1105, and or a similar connectable/disconnectable cathode section, discussed below, for limited times virtual electrical characteristics, different from the inherent characteristics of the electrode material, can be created. For example, if a different type of electrode material, with a different electrochemical reaction potential and electrode potential, is held in section 1107 than that in section 1105, the control system may activate section 1105 for a fraction of the time (for example, in activation cycles) yielding an effective potential at the battery contacts with a blended or otherwise unique electrical potential selectable by the system. By testing the effective potential output by the cell with different fractions of overall time generating current from the switchable section 1105, and patterns thereof, the system may further assess and create a wide variety of potentials (for example, an additional potential to fill in a detected gap in electrical characteristics created by another cell within a common circuit with system 1101).

Similarly, a substantially hollow-cylindrically-shaped major cathode material section 1115 is pictured, also comprising two exemplary sections, 1117 and 1119, at least one of which is of system-variably-engageable/activatable cathode material, similarly variably insulated by insulation material, such as insulation barriers 1121, and system-actuable switch hardware 1123. By controlling switch 1123, a control system may engage/activate or sequester the electrical charge- and power- and other characteristics- and capabilities-delivering effects of section 1117, and, when engaged/activated deliver it to a positive electrical contact 1125. The selectably-connected anode and cathode sections, 1105 and 1117, may be activated or isolated in unison, or in another complementary fashion by a control system, such as by activating the anode section 1105 first, and the cathode section afterword, while leaving them simultaneously engaged for a period of time. In some embodiments, an electrolyte/separator between the anode and cathode sections 1103 and 1115 may also be selectably engaged, or contain selectably engaged isolated sections, or contain an activatable electrolyte component (such as ions, or a system-changeable concentration of ions) which, when altered by a control system, may be used to create different potentials and other electrical characteristics, or virtual characteristics, for example, to address a gap or other shortage in the cell or other cells or power sources in a common circuit with the cell.

When cell system 1101 is manufactured, sections 1103 and 1115 may fit within one another, as shown by combination motion arrow 1129, and an insulating or electrolytic separation material, such as 1127, may separate them from one another, and other materials. Finally, the combined pair of major sections 1103 and 1115 may be placed within housing materials 1130 and contact extension materials 1131, the latter of which serves as a cap threadable onto the former, and forming inner conductive contacts with contacts 1109 and 1125.

In practice, many more anode and cathode material sections, such as sections 1103 and 1115, and conductive switches and insulated sub-sections may be combined in a single cell system and housing (such as 1130), thereby greatly increasing the type and degree of electrical capabilities and characteristics that a control system may supply upon demand to an electrical circuit in which the combined battery cell system 1101 may be installed. As with other embodiments of the invention, discussed above, a control system may be provided on board the battery cell 1101, or may be located externally or on board another cell, and may commonly manage and control several such cells.

Figure 12:
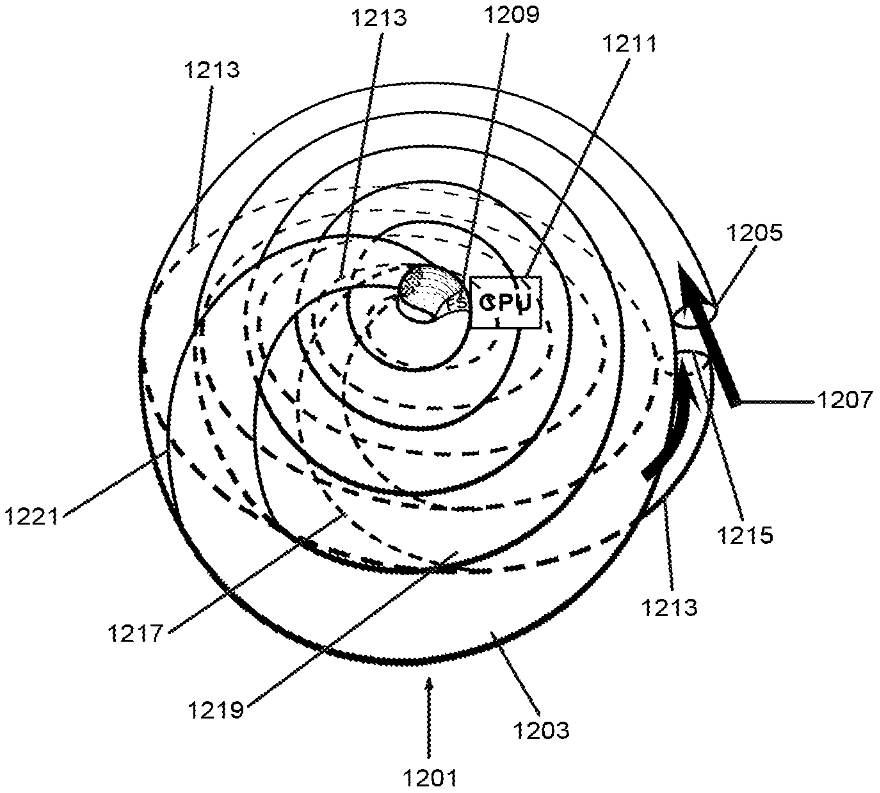
FIG. 12 is a perspective drawing of an exemplary variable-, selectable-length, switchable fiber-optic run system, for altering and delivering electromagnetic or other radiation power, or other electrical or electromagnetic characteristics and capabilities in accordance with aspects of the present invention.

FIG. 12 is a perspective drawing of an exemplary variable-, selectable-length, switchable fiber-optic run system 1201, for altering and delivering electromagnetic or other radiation power, or other electrical or electromagnetic characteristics and capabilities in accordance with aspects of the present invention. A primary spiral coil of optical fiber 1203 receives electromagnetic radiation from an input 1205, as demonstrated by initial propagation direction arrow 1207. As electromagnetic radiation so enters primary coil 1203, it spirals, within the confines of coil 1203, inward until reaching a central propagation pathway switching unit 1209, which may be controlled by a control system/central processing unit 1211. Control system 1211 may actuate switching unit 1209 to focus and/or guide electromagnetic radiation, radiation rays, or other units, groups and/or signals to one of a number of outlet paths, which have various lengths. As an example of the switching hardware 1209, a control-system actuable lens, beam-splitter, mirror or pathway altering electrically-actuated media may be used (along with control-system controlled actuators affecting it/them) to so select and channel radiation or other units, groups or signals to any of the selected various available fiber optic paths. Some available, switchable outlet paths lead carried electromagnetic radiation through an exit spiral 1213 of comparable length to the primary coil 1203, which may then be delivered or re-routed from an outlet 1215. Other selectable pathways are shorter, such as bypass route 1217, which, if selected, leads electromagnetic radiation to enter an outermost spiral location 1219 of exit spiral 1213. Another selectable route out from the center, 1221, may lead the guided, propagated radiation to re-enter the primary coil 1203, and, if such a path is repeatedly selected by a control system, may lead to a virtually unlimited distance path, prior to the system selecting a path leading to outlet 1207, as shown by propagation arrow 1225.

By selectively using the switching hardware to select among and use the many possible propagation paths to channel radiation, or units and groups thereof, or signals, run system 1201 may be used to store electromagnetic energy or other characteristics during transmission, compile, separate, combine or otherwise alter an output electromagnetic power carrier over time, and create different levels of power delivery, or other characteristics or capabilities, for delivery at an outlet or appliance at different user and/or control-system directed times. An exemplary control system for managing system 1201, and other aspects of the present invention, is provided below, in reference to FIG. 13.

Figure 13:
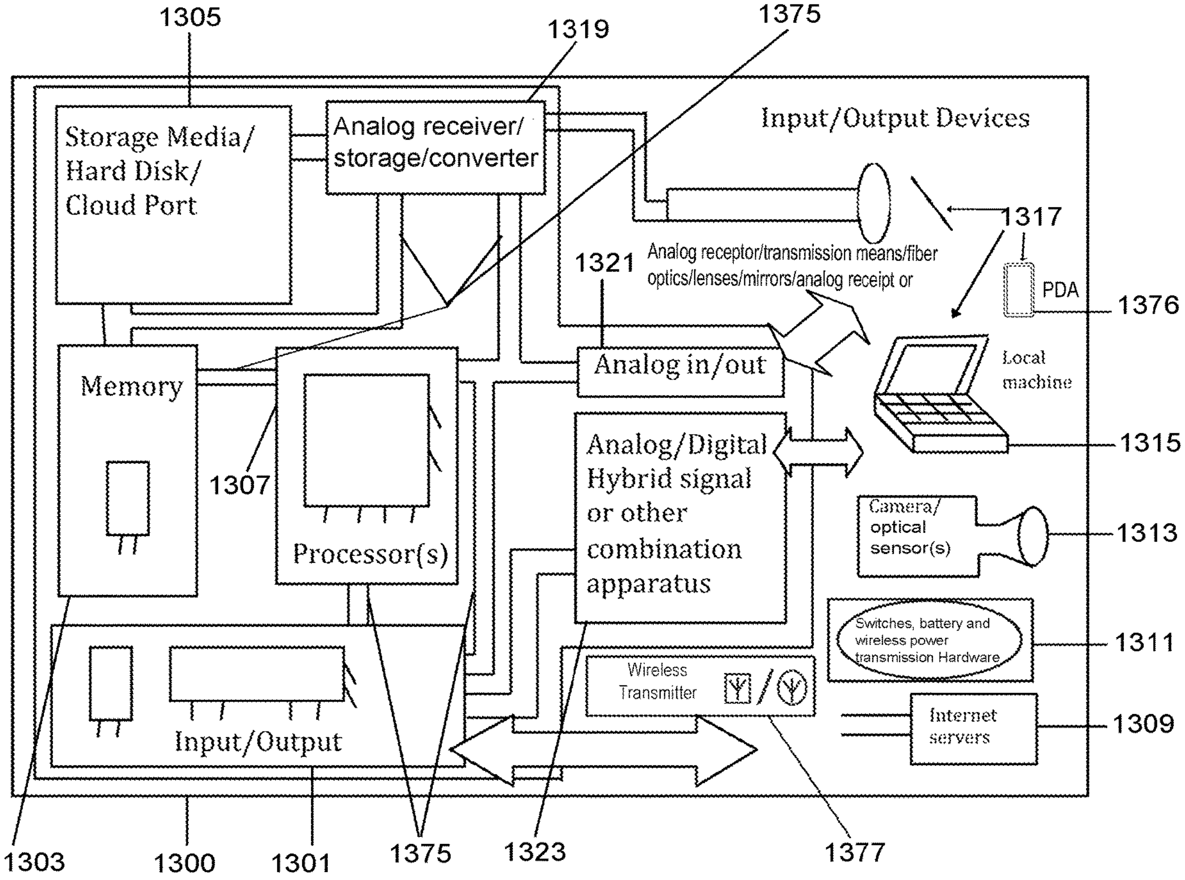
FIG. 13 is a schematic block diagram of some elements of an exemplary control system that may be used in accordance with aspects of the present invention.

FIG. 13 is a schematic block diagram of some elements of an exemplary control system 1300 that may be used in accordance with aspects of the present invention, such as, but not limited to, increasing electrical characteristics and capabilities of a battery cell, selectively bypassing and/or hot-swapping battery cells, exporting addressed power and/or other characteristics and coded signals, optimizing and routing wireless power transmissions, receiving or relaying such signals and/or characteristics and/or managing other battery cell hardware. The generic and other components and aspects described herein are not exhaustive of the many different systems and variations, including a number of possible hardware aspects and machine-readable media that might be used, in accordance with the present invention. Rather, the system 1300 is described to make clear how aspects may be implemented. Among other components, the system 1300 includes an input/output device 1301, a memory device 1303, storage media and/or hard disk recorder and/or cloud storage port or connection device 1305, and a processor or processors 1307. The processor(s) 1307 is (are) capable of receiving, interpreting, processing and manipulating signals and executing instructions for further processing and for output, pre-output or storage in and outside of the system. The processor(s) 1307 may be general or multipurpose, single- or multi-threaded, and may have a single core or several processor cores, including, but not limited to, microprocessors. Among other things, the processor(s) 1307 is/are capable of processing signals and instructions for the input/output device 1301, analog receiver/storage/converter device 1319, analog in/out device 1321, and/or analog/digital or other combination apparatus 1323 to cause a display, light-affecting apparatus and/or other user interface with active physical controls, such as a battery cell replacement or failure-indicating interface (any of which may be comprised or partially comprised in a GUI) to be provided for use by a user on hardware, such as a specialized personal computer monitor or PDA (Personal Digital Assistant) screen (including, but not limited to, monitors or touch- and gesture-actuable displays) or terminal monitor with a mouse and keyboard or other input hardware and presentation and input software (as in a software application GUI), and/or other physical controls, such as a button, knob or LEDs for determining battery replacement, optimized wireless and other power transmissions and routes, bypass, proper installation, or other battery conditions or statuses or related circuit or other characteristics. Alternatively, or in addition, the system, using processors 1307 and input/output devices 1319, 1321 and/or 1323, may accept and exert passive and other physical (e.g., tactile) user, battery, circuit and environmental input (e.g., from sensors) and output.

For example, and in connection with aspects of the invention discussed in reference to the remaining figures, the system may carry out any aspects of the present invention as necessary with associated hardware and/or using specialized software, including, but not limited to, controlling electrical characteristics sensors, an auxiliary storage/H.P.A.S. or other power storage device and associated conducting, addressing, leading signal communication device and/or selection complex, variably-activating electrode or electrolyte sections, converters, transformers, variable-length conduit path switches, and other characteristics modification, delivery and addressing hardware, a multiplex conduction system for hot-swapping, variably isolating, reordering, repairing or otherwise variably adjusting networked battery cells, and may implement other controls, power and other characteristics effectuated through such multiplex, network system, and the networked devices themselves or other computer systems. The system may also, among many other things described for control systems in this application, respond to user, sensor and other input (for example, by a user-actuated GUI controlled by computer hardware and software or by another physical control) to issue alerts, alter settings, carry out repair activities, and halt the conduction of current and power from a cell upon detecting critical condition(s) monitor the status and inventory of battery cells, an appliance and a circuit in general, control wireless power and signal transmission hardware, or perform any other aspect of the invention requiring or benefiting from use of a control system. The system 1301 may permit the user and/or system-variation of settings, including but not limited to the affects of user activity on modes of operation of the system, and send external alerts and other communications (for example, to users and administrators) via external communication devices, for any control system aspect that may require or benefit from such external or system-extending communications.

The processor(s) 1307 is/are capable of processing instructions stored in memory devices 1303 and/or 1305 (and/or ROM or RAM), and may communicate with any of these, and/or any other connected component, via system buses 1375. Input/output device 1301 is capable of input/output operations for the system, and may include/communicate with any number of input and/or output hardware, such as a computer mouse, keyboard, entry pad, actuable display, networked or connected second computer, other GUI aspects, camera(s) or scanner(s), sensor(s), sensor/motor(s), actuable battery cells (with actuation instruction receiving and following hardware), specialized cell, cell-array and other radiation or electrical characteristics storage and transmission affecting hardware, as discussed in this application, range-finders, GPS systems, receiver(s), transmitter(s), transceiver(s), rectennas, transflecting transceivers ("transflecters"), antennas, sensor(s), electromagnetic actuator(s), mixing board, reel-to-reel tape recorder, external hard disk recorder (solid state or rotary), additional hardware controls (such as, but not limited to, buttons and switches, and actuators, current or potential applying contacts and other transfer elements, light sources, speakers, additional video and/or sound editing system or gear, filters, computer display screen or touch screen. It is to be understood that the input and output of the system may be in any useable form, including, but not limited to, signals, data, commands/instructions and output for presentation and manipulation by a user in a GUI. Such a GUI hardware unit and other input/output devices could implement a user interface created by machine-readable means, such as software, permitting the user to carry out any of the user settings, commands and input/output discussed above, and elsewhere in this application.

1301, 1303, 1305, 1307, 1319, 1321 and 1323 are connected and able to communicate communications, transmissions and instructions via system busses 1375. Storage media and/or hard disk recorder and/or cloud storage port or connection device 1305 is capable of providing mass storage for the system, and may be a computer-readable medium, may be a connected mass storage device (e.g., flash drive or other drive connected to a U.S.B. port or Wi-Fi) may use back-end (with or without middle-ware) or cloud storage over a network (e.g., the internet) as either a memory backup for an internal mass storage device or as a primary memory storage means, or may simply be an internal mass storage device, such as a computer hard drive or optical drive.

Generally speaking, the system may be implemented as a client/server arrangement, where features of the invention are performed on a remote server, networked to the client and made a client and server by software on both the client computer and server computer. Input and output devices may deliver their input and receive output by any known means of communicating and/or transmitting communications, signals, commands and/or data input/output, including, but not limited to, input through the devices illustrated in examples shown as 1317, such as 1309, 1311, 1313, 1315, 1376 and 1377 and any other devices, hardware or other input/output generating and receiving aspects. Any phenomenon that may be sensed may be managed, manipulated and distributed and may be taken or converted as input or output through any sensor or carrier known in the art. In addition, directly carried elements (for example a light stream taken by fiber optics from a view of a scene) may be directly managed, manipulated and distributed in whole or in part to enhance output, and radiation or whole ambient light or other RF information for an environmental region may be taken by photovoltaic apparatus for battery cell recharging, or sensor(s) dedicated to angles of detection, or an omnidirectional sensor or series of sensors which record direction as well as the presence of electromagnetic or other radiation. While this example is illustrative, it is understood that any form of electromagnetism, compression wave or other sensory phenomenon may become such an "ambient power" source and include such sensory directional and 3D locational information, which may also be made possible by multiple locations of sensing, preferably, in a similar, if not identical, time frame. The system may condition, select all or part of, alter and/or generate composites from all or part of such direct or analog image or other sensory transmissions, including physical samples (such as DNA, fingerprints, iris, and other biometric samples or scans) and may combine them with other forms of data, such as image files, dossiers or metadata, if such direct or data encoded sources are used.

While the illustrated system example 1300 may be helpful to understand the implementation of aspects of the invention, it is understood that any form of computer system may be used to implement many control system and other aspects of the invention—for example, a simpler computer system containing just a processor (datapath and control) for executing instructions from a memory or transmission source. The aspects or features set forth may be implemented with, as alternatives, and/or in any combination of, digital electronic circuitry, hardware, software, firmware, or in analog or direct (such as electromagnetic wave-based, physical wave-based or analog electronic, magnetic or direct transmission, without translation and the attendant degradation, of the medium) systems or circuitry or associational storage and transmission, any of which may be aided with enhancing media from external hardware and software, optionally, by wired or wireless networked connection, such as by LAN, WAN or the many connections forming the internet or local networks. The system can be embodied in a tangibly-stored computer program, as by a machine-readable medium and propagated signal, for execution by a programmable processor. The method steps of the embodiments of the present invention also may be performed by such a programmable processor, executing a program of instructions, operating on input and output, and generating output. A computer program includes instructions for a computer to carry out a particular activity to bring about a particular result, and may be written in any programming language, including compiled and uncompiled, interpreted languages, assembly languages and machine language, and can be deployed in any form, including a complete program, module, component, subroutine, or other suitable routine for a computer program.

Figure 14:
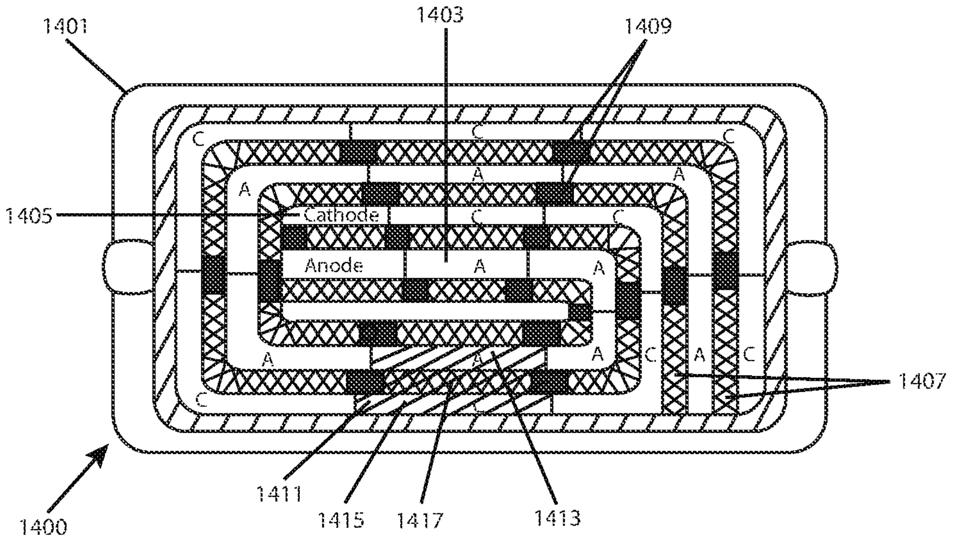
FIG. 14 is a top view depicting a control system-variable battery with separate connectable anode and cathode sections, in accordance with aspects of the present invention.

FIG. 14 is a top view depicting a control system-variable battery 1400 with separate connectable anode and cathode sections. Layers of anode material 1403 and cathode material 1405 are separated by separator layers 1407, which contain an electrolyte. Electrode materials 1403 and 1405 and separator layer(s) 1407 each comprise periodic or otherwise regularly-spaced internal insulating compartment separation strips, such as those examples shown as 1409, which are so periodic or otherwise regularly-spaced that, when wound together in spiral layers (as pictured), they align with one another laterally, creating electrically insulated cathode/anode pairings, an example of which is shown as pairing 1411, illustrated by the commonly shaded anode section 1413, cathode section 1415, and separator section 1417. Each such pairing 1411 comprises a separable (separately activatable by switches for electrical conduction) section of anode material, such as that shown as 1413, and a separable section of cathode material, such as that shown as 1415, and a section of separator material, such as that shown as 1417, between them. Thus, when various groups of such cathode/anode pairings are activated by electrical connection and variably arranged and related with other pairings and other circuit components, with additional cell and cell-part arrangement-altering circuitry and hardware, such as that which is discussed elsewhere in this application, the available capacity and certain other electrical characteristics of the entire battery 1400 may be varied by a control system, such as a control system comprising hardware and software.

An example of such a hardware and software control system is provided with reference to FIG. 13, above.

A pairing of electrically insulated cathode/anode sections such as pairing 1411 may be activated, for example, by switches (not pictured) actuated by such a control system that variably connect separate electrical leads or other conduction materials (which, in some embodiments, comprise or are connected to an electrical contact or contacts for the battery) to each section of electrolyte material, such as sections 1413 and 1415. A control system may also employ other circuit-varying hardware to place any pairing or anode or cathode connection in any parallel, series or other circuit order (or partially parallel, series or other circuit order) with any other circuit element. For example, multiplex connection hardware, such as that discussed with reference to FIG. 10, but connected to pairings or electrode material, may allow the control system to isolate and vary the order of the connected pairings, electrode material and other circuit elements. By controlling the timing of activation or isolation of connected pairings and electrode (switching their connection to the circuit "on" or "off," for periods of time or in cycles or other activation patterns), the control system may also effectively limit their contribution to the circuit, and create virtual properties that differ from the general properties of the battery, its materials, and pairing. For example, because each pairing may be significantly smaller than the overall battery, containing less electrolyte and electrode material, the pairings may be able to experience voltage drop from use more quickly than a larger cell and, by engaging pairings one-at-a-time, rather than all at once, the control system can effectively create a lower voltage from the battery, or, by selecting more than one pairing simultaneously, and/or by overlapping engagement, a wide variety of other effective voltages may be selected and contributed to the circuit, at the election of a control system and/or user. In addition, or as an alternative, such pairings or electrode material sections may be placed in parallel or in series with one another, and other circuit elements, to create different voltages, current, resistance, capacities, and other electrical characteristics, and such arrangements can be varied over time by the control system to achieve a wide variety of possible battery performance and characteristics. As another example, pairings of electrode materials may also comprise isolated, or switchably isolated, sections of electrolyte and separator material through which ion transfer takes place, and the concentration or other properties of the electrolyte may be actuably varied by the control system to, for example, change the effective potential of the pairing and/or cell. In addition, different pairings accessible by the system may contain a variety of different electrode and electrolyte/separator materials, with differing galvanic properties, yielding accessible potentials or other electrical characteristics accessible for application by the battery cell system. Such selected characteristics and battery performance can be varied over time by the control system, for example, to meet varying loads or other needs experienced by the circuit, and/or sensed by the control system, or to monitor and alter the actual output by the cell, sensed by the control system, to meet the needs or a nominal or standard actual voltage of the cell (or cell's type), or to monitor a circuit's or other electrical cell's characteristics, and/or supply gap-filling potentials or other electrical characteristics.

Figure 15:
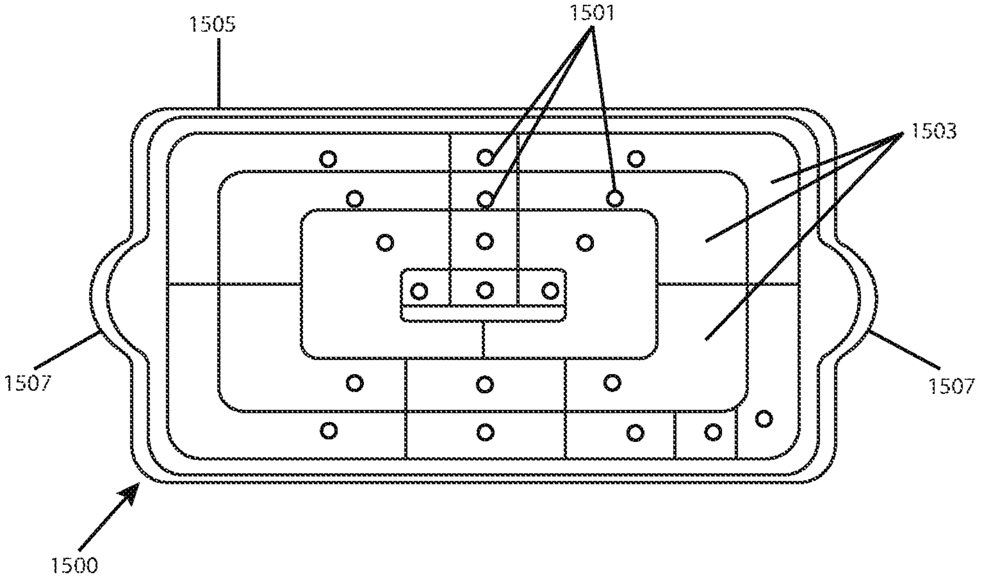
FIG. 15 is a bottom, inside view depicting a battery cap for use with a battery with separate connectable anode and cathode sections, such as the battery discussed with reference to FIG. 14, above.

FIG. 15 is a bottom, inside view depicting a battery cap 1500 for use with a battery with separate connectable anode and cathode sections, such as the battery discussed with reference to FIG. 14, above. Cap 1500 can be fastened or merged with a battery housing, and, when so fastened or merged, comprises a part of the battery housing, such as housing 1401. On its interior surface, cap 1500 includes plural isolated, switchable contacts, such as those examples shown as 1501, which, when cap 1500 is mounted on a battery, completing its housing, each contact a separated, insulated electrode material section (which may be part of a pairing), or electronic leads to electrode material sections, such as the sections and pairings discussed above, with reference to FIG. 14. In addition, control-system-switchable contacts 1501 may conduct electricity to switching and other connection-varying hardware, or leads thereto, such as electrically isolatable lead examples 1503.

A control system, such as a control system comprising hardware and software, examples of which are discussed above, may actuate hardware (not pictured) switching any of leads 1503 and/or contacts 1501, on or off, such that electrical conduction pathways may be completed between selected: (A) sections of anode material, (B) sections of cathode material or (C) pairings or other groups of electrode and/or electrolyte materials.

Cap 1500 preferably comprises an outer housing material 1505 and complementarily-shaped (in comparison to the shape of housing 1400 of the battery) lips 1507, which, when cap 1500 is installed onto battery 1400, completing its housing, overlaps and conforms with the shape of outer housing material 1401. A manufacturing process may then preferably weld or otherwise bond housing material 1505 with housing material 1401 at their areas of overlap to complete a fluid-tight seal. Alternatively, or in addition, an o-ring, gasket or other sealing device may aid in creating a fluid-tight seal. In addition, a safety valve may be included in the completed, merged housing to release pressure or permit the flow of gases or other fluids under some conditions, to improve the function of the battery.

Figure 16:
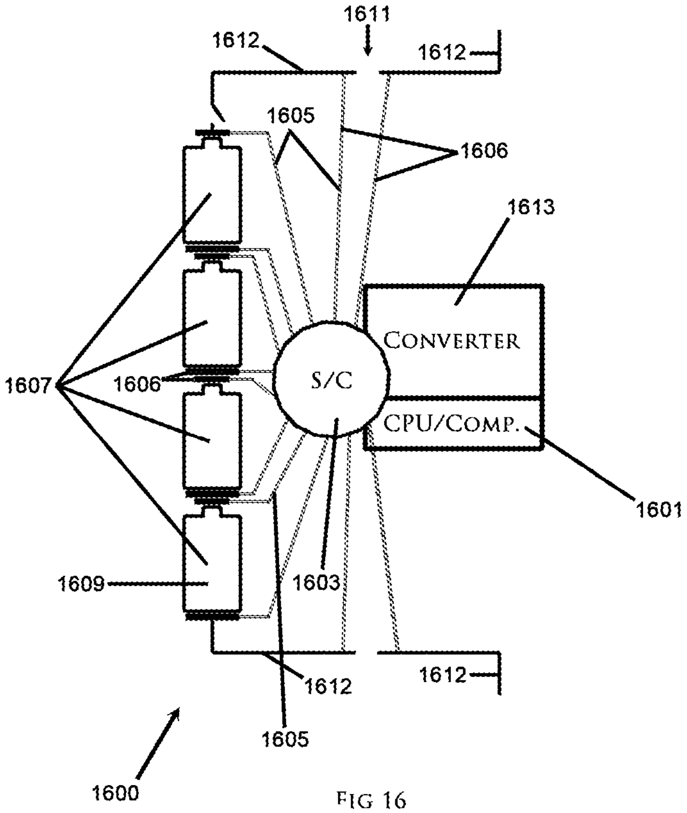
FIG. 16 is a schematic diagram depicting an exemplary specialized power system of switchable electronic devices in a variable circuit controlled by a hardware and software control system, in accordance with aspects of the present invention.

FIG. 16 is a schematic diagram depicting an exemplary specialized power system 1600 of switchable electronic devices in a variable circuit controlled by a hardware and software control system, such as that partially pictured as 1601, in accordance with aspects of the present invention. The control system 1601 can be a wide variety of possible forms and, in some embodiments, comprises a computer and/or central processing unit ("C.P.U."). Some examples of possible control system embodiments are discussed above, for example, with reference to FIG. 13. In some embodiments, control system 1601 controls a switching/control unit 1603, which controls electrical conduction through variable electrical connections. For example, control system 1601 may actuate switching to turn variable electrical buses or other connectors, such as those examples pictured as buses 1605 and battery contacts 1606, on or off (conducting electricity in a circuit or isolated from doing so) and separately place circuit components connected to any of 1605 in any parallel or serial order, or partially so or in combinations thereof, with one another. For example, control system 1601 may actuate switching/control unit 1603 to connect one of battery cells 1607, such as battery cell 1609, at an input and/or output position in a circuit selected by the control system, such as position 1611 within circuit wiring 1612, by activating and connecting its positive and negative contacts to buses/connectors 1606. In addition, control system 1601 may first channel the output of cell 1609 through a converter 1613, and also control converter 1613 to modify the voltage, current, resistance, duration(s), signal aspects (such as embedded encoding) or any other electrical characteristic output by cell 1609, prior to connecting it to position 1611 (or such other position as may be selected by the system 1601). In addition to such reordering, and conversion, switching/control unit 1603 may be actuated by the control system 1601 to isolate, bypass and/or partially bypass any such battery cell or other circuit component from conducting or connecting electricity or other electrical characteristics or capabilities from a circuit, or a part thereof, for example, providing only partial contribution of electrical characteristics (e.g., and converting that contribution) from such a component. In a preferred embodiment, if the power system has been activated by a user or the control system (for example, to run an appliance or make power available for running an appliance), the control system first assesses the needs of a load (or loads) present in the present circuit. If no external load is present, system 1601 next senses electrical characteristics of at least some of cells 1607, or a circuit order arrangement of plural cells such as 1607, and, preferably, at least the voltage of each of cells 1607, or all of cells 1607, placed in series. Based on those readings, the system may determine whether any of cells 1607, or the arrangement of at least some of cells 1607 fails to match a nominal, normal, or otherwise expected or default amount (or amounts) of such characteristics for the cells or for the arrangement. If so, the system may next route at least one cell, and, preferably, at least a properly functioning cell with a relatively high state of charge in comparison to others, or a cell with other greater characteristics than other cells, and convert its output (by routing its output through converter 1613, using switching/controller 1603) to that level necessary to fill/subtract the gap in voltage or other characteristics caused by the failure to match an expected or default amount.

Figure 17:
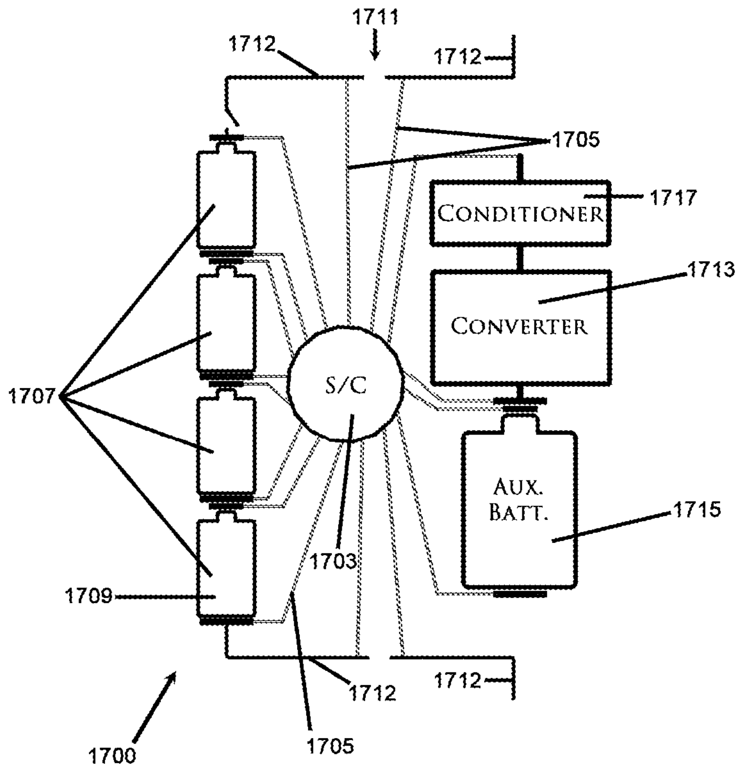
FIG. 17 is a schematic diagram depicting another, more complex exemplary specialized power system of switchable electronic devices in a variable circuit controlled by a hardware and software control system, in accordance with aspects of the present invention.

FIG. 17 is also a schematic diagram depicting an exemplary specialized power system 1700 of switchable electronic devices in a variable circuit controlled by a hardware and software control system, in accordance with aspects of the present invention. Although, as with power system 1600, above, power system 1700 may comprise a control system, the control system is not separately pictured in FIG. 17, for simplicity. However, it should be understood that a control system with the same general abilities, and of the same possible forms as discussed above, may be used, and may control, connect, isolate and reorder in the pathway of a circuit any component within the circuit, among other additional capabilities for control systems set forth above. The control system may also be present in and or connected for power transmission, signaling and hardware actuation control, to any component pictured in the diagram or within a circuit. Similar devices and other components as discussed in reference to FIG. 16 are provided, labeled with the same latter two digits, for clarity, in FIG. 17. Because the functions and possible isolation, bypass, partial bypass, and ordering, reordering, conversion and selectable input and output positions of the analogous devices and components with the same latter two digits are similar, they are not discussed again at length here. However, power system 1700 comprises additional device components, auxiliary battery 1715 and output conditioner 1717. As with the other components shown and carried over from FIG. 16, device components 1715 and 1717 may be variably connected and ordered by a control system actuating switching (using a switching/controller, now 1703) to turn variable electrical buses or other connectors, such as those examples pictured as 1705, on or off (conducting electricity in a circuit or isolated from doing so) and place circuit components connected to any of 1705 in any parallel, serial or other order, or combinations thereof, with one another. Rather than only convert the output of a battery cell, and/or reorder it for power delivery, power system 1700 has additional flexibility to store power or other electrical characteristics and/or capabilities within auxiliary cell 1715 for use when needed for gap filling or other electrical characteristics-supplying activities, and may convert such characteristics or capabilities by activating cell 1715 and converting its output and placing it at any desired possible output location and order in a circuit so accessible by the control system. Preferably, cells 1707 and 1715 are each fully charged by an external power source, but a series arrangement of cells 1707, only, is initially created for power output by the power system 1700, in an ordinary power output mode. As the circuit is thus used, however, one or several of cells 1607 may begin to lag in its performance, with a lower voltage, output voltage, power, lower current, or greater resistance, among other possible electrical characteristics creating a "gap" in comparison to the initial, or otherwise expected output of the series. At that point, the control system may selectively at least partially bypass such a cell, and may begin to supply gap-filling performance, voltage, output voltage, power, current or other characteristics or capabilities, by activating cell 1715 and converting its output characteristics and/or capabilities for placement in the same ordered position as the cell, relative to the other cells and circuit components or, alternatively, to a new output position, such as 1711. In this way, power system 1700 is able to actively monitor the circuit's performance, compare it to a standard or otherwise expected performance capability, and maintain that performance, with no need to address the particular needs of a load. However, in some embodiments, such needs are also monitored and addressed by the variable output capabilities of the power system 1700. In addition to converting power, voltage and other electrical characteristics and capabilities via a converter, now 1713, power system 1700 may further selectively condition power output using conditioner 1717. For example, if the control system's activities in restoring ordinary operating power fails to fully fill a detected gap, or if further anomalies, gaps, interruptions or spikes in power output arise from the control system's operation, power, voltage, current and other output electrical characteristics and capabilities may be smoothed or otherwise re-patterned to normalize or otherwise improve them prior to output to an appliance.

Because the control system (or systems) may place each cell 1707 (or 1607) in any order with one another, using switching/control unit 1703 (or 1603), a wide variety of alternative series, parallel, partially series, and/or partially parallel arrangements may be created, and then output, anywhere in the circuit (for example, at additional locations for switchable output contacts, in addition to, or instead of location 1711, to optimize the performance of the circuit and power sources thereof. For example, in some embodiments, each cell 1707 may be placed equally partially in series in multiple common series output locations, such that, for example, each cell has ¼ of its output or otherwise applied characteristics placed in a first series position, each cell has ¼ of its output or otherwise applied characteristics placed in a second series position, each cell has ¼ of its output or otherwise applied characteristics placed in a third series position, and each cell has its output or otherwise applied characteristics placed in a fourth series position. Switchable sections of each cell, or a partial bypass conductor, may be used to assist in so dividing the output or otherwise applied characteristics of each cell. In addition, or instead, the control system may periodically switch series locations of each cell, while keeping them in series, to better balance the load, stresses and other conditions of each cell, aiding in maintaining a balance in their qualities.

All of the embodiments discussed in this application are intended to exemplify and to enhance the understanding of aspects of the invention, and are not exhaustive of the practically infinite additional embodiments falling within the scope of the invention. In some additional embodiments, a heat or other stress redistribution system may be used to reduce or otherwise alter the heat or other stress placed on deteriorated or lagging cells and/or healthier cells, in comparison to one another. For example, a resistor (or resistors) may be used by a control system to assist in balancing charge between several cells, by reducing the level of charge in cells that with too high a state-of-charge (S.O.C.), relative to other cells, bringing them into balance and, in so doing, may cool lower cells, or create or maintain resistive heat energy release at the higher S.O.C. cells. Other embodiments may also include a wide variety of additional electronic components known in the art for controlling, modifying and augmenting power and other electronic characteristics of a circuit and its components. For example, in some embodiments, a control-system controlled amplifier (or amplifiers) may be used to increase the strength of signals or other output, either in a central location, switchably engageable with any cell or other component, or resident on or within a cell, cells or other components. Some embodiments may include cell-to-cell, or cell group-to cell group charging methods, in addition to the methods discussed above. In other embodiments, an auxiliary power source, such as 1715 may have at least some of its characteristics transformed and/or placed at the point of a low or lagging battery cell, or in the same order selected for a low or lagging battery cell, to more correctly replace the lost characteristics of that low or lagging battery cell—rather than place such characteristics in another point on the circuit. In some embodiments, even a low or lagging cell remains partially contributing its characteristics, to fully contribute all available characteristics to the circuit (within safe, or cell health-optimizing limits). In some embodiments, healthier cells may be kept more active than lower cells (for example, transformed and delivering a greater share of the total voltage or power, than other cells, to wear those cells out more greatly, and better match the conditions of each cell in subsequent cycles. It is within the scope of this invention that, over time, some cells in available to the control system will become so low, deteriorated or damaged that they require complete bypass, while other cells remain healthy and charged enough to continue supplying the circuit. In such instances, the control system may so completely bypass such low, deteriorated or damaged cells and replace their entirely absent contribution with electrical power, capabilities or characteristics alteration hardware. By the methods and systems set forth in this application, non-standard entirely different cell types may also be interposed into a circuit, and may be connected or selectably connected and have its characteristics altered and applied to the circuit to fill gaps toward a characteristics level needed by the circuit or load or initially or ideally present with a certain number and arrangement of other cells, or a nominal, standard or expected level for the circuit, or bypassed, or partially bypassed, or used only to charge any other cells or power sources. Similarly, such a system may be used to convert or otherwise alter characteristics from an external charging power source, by first determining, and then so applying, its characteristics to charge any chargeable cell (if determined by the system to benefit from, and be safely able to accept, such charging). Cell or other power source identification signals or standard, nominal and/or starting readings of cells and power sources may aid the system in determining useful electrical characteristics goals in gap-filling and alteration and conversion settings and actions needed to achieve a correct output for a circuit. Although wired circuit hardware, architectures and topologies have been set forth in the present invention, it is within the scope of this invention that ambient electrical characteristics transmission, such as targeted radiation beams and receivers for transferring energy (which also may be used for signal transmission), and inductive transfer of electrical characteristics, by wireless targeting and transfer methods, may be used instead of, or in addition to, any bus, wire or other physical conductor. Similarly, although switching hardware with on and off settings have been predominantly used in the embodiments set forth above, it is within the scope of the invention that hardware implementing variable degrees of conduction between switched circuit components may also, or alternatively, be used to accomplish most switching operations indicated above, as degrees of switching. Similarly, wherever transforming or other converting hardware is used above, it should be understood that switching at least some power sources, cells or sections thereof from parallel to series configurations to variable degrees, and vice versa, may fall within the scope of such disclosures. Where selectable, activatable sections of electrolyte and electrode materials are disclosed above, it should also be understood that any other device creating a different, selected reaction area or volume of or effective fraction of reaction of electrolyte and/or electrode material, or the components thereof, may also, or additionally, be used. For example, in some embodiments, a selectable degree of electrolyte, or electrolyte components, may be injected, chemically released or activated, or otherwise introduced by a control system to change electrical characteristics and/or capabilities of a cell, or section thereof. While the embodiments above have demonstrated the replacement of electrical characteristics and capabilities by various hardware, systems and methods set forth above, in certain series configurations of cells, it should be understood that the gap-filling techniques apply also to addressing lagging circuit contributions from cells in parallel or partially parallel, and partially series configurations, as well. Finally, although gap-filling is carried out between cells with different characteristics and capabilities, it should be understood that characteristics and capabilities of entire modules (groups of cells, in any series, parallel or partially series or partially parallel arrangement) may instead be monitored by the control systems set forth above, and subject to gap-filling based on initial, nominal, expected or otherwise optimal levels. Individual intra-cellular pairings, or sections of electrolyte and electrodes may also be so monitored and subjected to gap-filling from auxiliary cells and other power sources.

Figure 18:
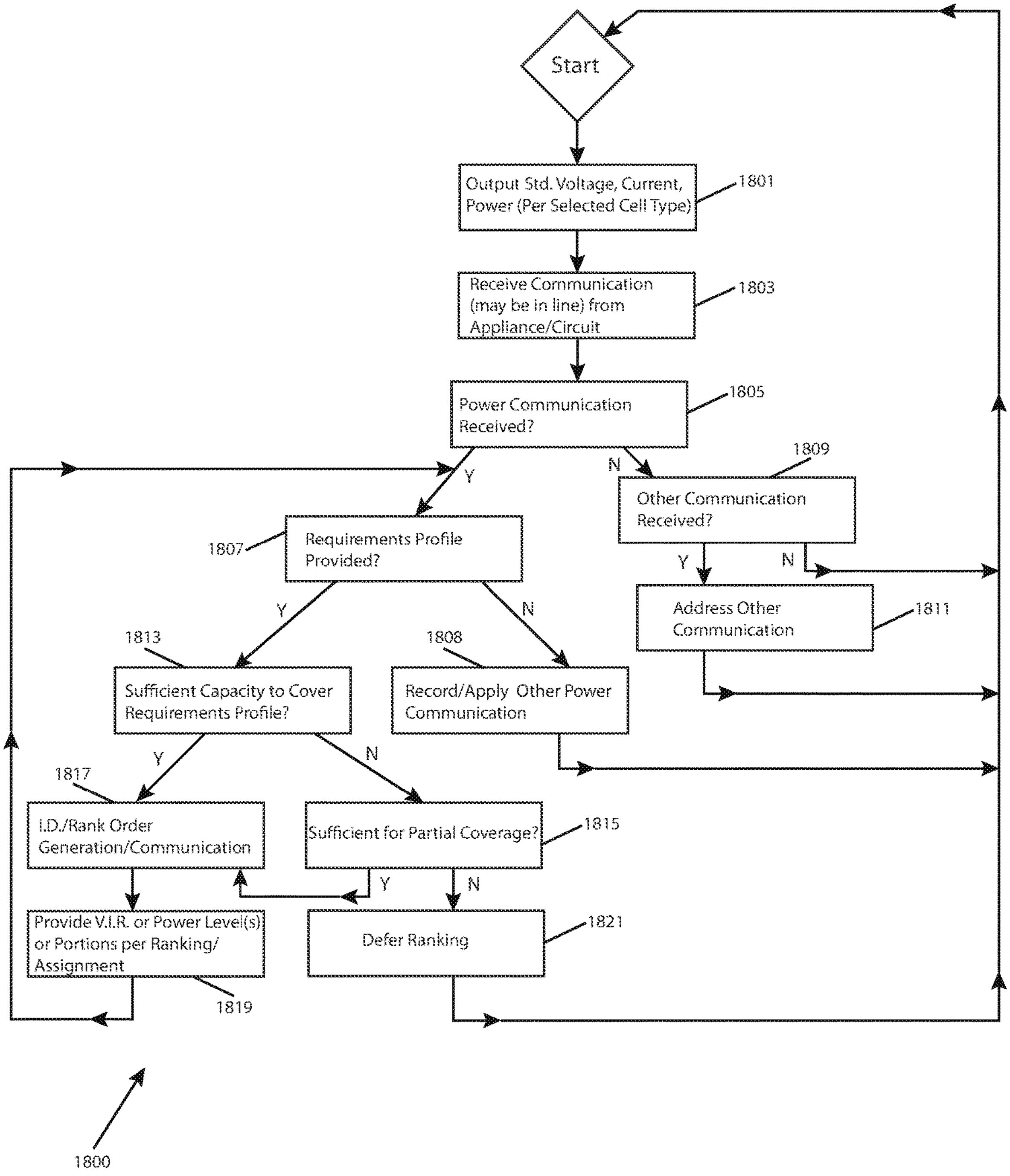
FIG. 18 is an exemplary process flow diagram of exemplary steps that may be taken by a power management control system, such as the hardware and software control system discussed with reference to FIG. 13.

FIG. 18 is an exemplary process flow diagram of exemplary steps 1800 that may be taken by a power management control system, such as the hardware and software control system discussed with reference to FIG. 13. In some embodiments, the power management system implementing exemplary steps 1800 may reside within a battery housing of a predetermined, required or standard size, such as an American National Standard Institute size battery-along with other battery components. In other embodiments, the control system carrying out steps 1800 may at least partially be incorporated in a common circuit with a battery or batteries, or another power source. In any event, preferably, the control system carrying out steps 1800 comprises, or is in communication with, sensory hardware or an intermediate control system capable of measuring the capacity and other electrical characteristics and capabilities of the power source. In addition, and as will be explained in greater detail below, the control system preferably comprises, or is in communication with, sensory hardware or an intermediate control system capable of determining a Requirements Profile of an appliance, circuit or other recipient of energy from the power source. A Requirements Profile is defined below, and elsewhere in this application. The control system is also able to control the output of power, current, voltage, delivery characteristics, transmission media and other electrical characteristics and capabilities of the power source via power control hardware, such as voltage or other electrical characteristics output regulator or other conditioner.

At step 1801, the control system begins by controlling the battery or other power source power output, creating and outputting a standard voltage, current, power and/or other electrical characteristics or capabilities (or patterns thereof, which may vary over time) to an electrical circuit. In practice, such standard characteristics and capabilities may be governmentally or industrially implemented, by specifications in regulations, agreements and product and application specifications. Some such standards may depend on a type of power source, such as a standard for interchangeable batteries. For example, a nominal, average or other expected voltage from an American National Standard Institute standard size cell (such as size AAA, AA, C and D) may dictate the standard electrical characteristics and capabilities provided in step 1801. In some embodiments, the standards and patterns thereof provided in step 1801 may be variably selected by the control system or a user, and may be based on the needs of a particular product or application. The control system then proceeds to step 1803, in which it receives any communications or indications relevant to the circuit, including, but not limited to communications or indications from an appliance or other load held in a common circuit with the power source. The control system then proceeds to step 1805, in which it determines whether it has received a communication or indication related to powering the circuit or any aspect thereof. If so, the control system proceeds to step 1807. If not, the control system may proceed to steps 1809 and 1811, and determines the nature and addresses the communication. For example, the circuit may be reporting information related to servicing or product identification information, or a command unrelated to power control, which may be recorded or otherwise addressed by the control system.

In step 1807, the control system determines whether a Requirements Profile has been provided for the circuit or an aspect of the circuit from the power-related communications and indications received in step 1805. If not, the control system proceeds to step 1808, in which it records or otherwise addresses those power-related communications or indications (other than a Requirements Profile), and returns to the starting position. A Requirements Profile, if provided to or ascertained by the control system, may comprise any information communicated or other indication of the power supply needs of the circuit, or a particular load or aspect of a circuit (such as an appliance). Such communications or indications as set forth in these steps may be provided by communications hardware of an appliance (such as wireless communications hardware) and may be encrypted and may uniquely identify the load aspect with the power supply needs communicated. But, in some embodiments, the communication or indication may be provided via the same media and hardware carrying out power transmission or other aspects of the electrical circuit, to improve design efficiency. For example, load characteristics may be ascertained by the control system by testing the circuit, or monitoring the draw of electrical characteristics from the power source. In some embodiments, any of steps 1801, 1803 and 1805 may be carried out in a different order, or simultaneously, by the control system. In some embodiments, such a Requirements Profile may comprise future needs of an aspect of the circuit (or the circuit overall) ascertained, predicted or evaluated, based on current trends in power, current, resistance and voltage drawn or requested by an aspect of the circuit supplied with power by the power supply. Such future needs may also be determined, in whole or in part, by standard needs for an aspect of the circuit under particular usage conditions, which the control system, or an external aspect, may determined to be present. If a Requirements Profile has been ascertained, in step 1807, the control system may proceed to step 1813, in which it determines whether the power source (such as a battery or set of batteries) has sufficient capacity or other electrical characteristics and capabilities to supply the power and other characteristics necessary to meet the Requirements Profile. If not, the control system proceeds to step 1815, in which it determines whether the power source has sufficient characteristics or capabilities to partially meet the Requirements Profile. If so, or if the power source has sufficient characteristics and capabilities to entirely meet the Requirements Profile, the control system proceeds to step 1817, in which it further communicates its characteristics and capabilities as they relate the Requirements Profile to other power sources, if any, or to other aspects of the circuit or other control systems. In response, other power sources and control systems may similarly report the characteristics and capabilities of other power sources, and a determination or agreement regarding characteristics and capabilities to be supplied by each power source, optimizing overall performance of all power sources supplying the subject circuit or circuit aspect, may be reached by the control system(s). To implement the optimized provision of characteristics and capabilities from each power source, the control system may identify (or agree to identification with other control systems) each power source or aspect, and, in some embodiments, create a ranking or proportionate share as to what characteristics and capabilities are to be supplied to the circuit or circuit aspect. In some embodiments, such ranking or share may be proposed by the control system and shared for agreement with external actors (such as other control systems, and a tie-breaking or arbitrating control system), or, instead, may dictated by the control system carrying out steps 1800. The control system then proceeds to provide electrical characteristics or capabilities in accordance with the ranking or share determined in step 1817, in step 1819. If the control system determines that the power source has insufficient characteristics and capabilities even to partially meet the Requirements Profile, the control system may defer to other power sources or remove the power source from the circuit, in step 1821. For example, if attempting even to partially supply the circuit or circuit aspect according to the Requirements Profile might create a dangerous or other critical condition, causing permanent damage to an aspect of the circuit, the control system may so defer or isolate the power source.

Figure 19:
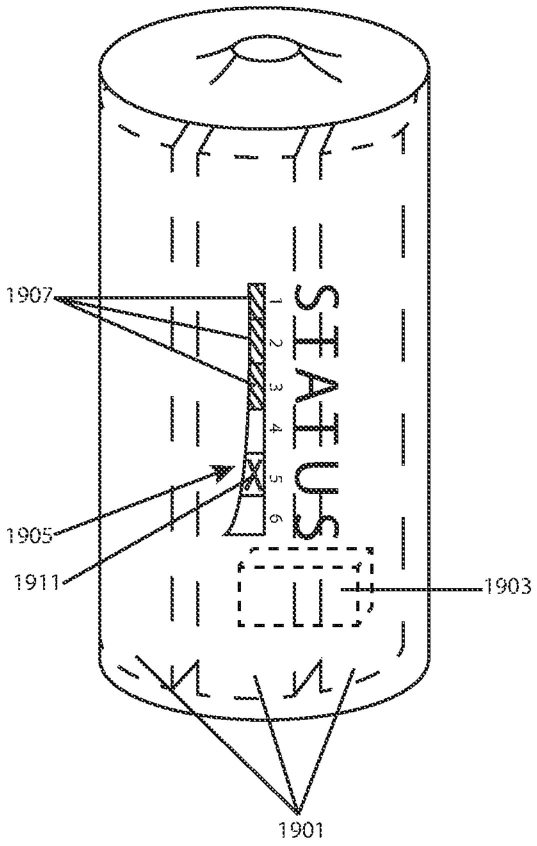
FIG. 19 is a perspective view of an exemplary specialized battery comprising multiple separately connectable and engageable internal sections of cathode and anode material.

FIG. 19 depicts an exemplary specialized battery 1900 comprising multiple separately connectable or engageable internal sections 1901 of cathode and anode material. Battery 1900 may comprise a control unit 1903, which may further comprise at least part of a control system, such as the control system set forth with reference to FIG. 13, above. Control system 1903 controls variable electrical connection hardware or partitioning hardware (not pictured). As a result, control system 1903 may activate and electrically connect (or isolate) any of sections 1901, and place them in any parallel, series, or other order with any other sections 1901, or power source in a common circuit with battery 1900, according to the methods set forth elsewhere in this application in relation to control systems and related hardware. Control system 1903 also comprises or controls sensors or other assessment hardware, through which it is able to assess electrical characteristics or capabilities, or conditions, in any of sections 1901 or in an electrical circuit of which battery 1900 is a part.

Control system 1903 also may comprise and control status display indicators, such as those pictured in variable battery display 1905, which may indicate the activation, engagement and statuses of sections 1901, and battery 1900 overall. For example, if there are six sections 1901, and three sections retain sufficient capacity, characteristics or other capabilities required for providing power to a circuit (such as providing a standard amount of power or another characteristic, or characteristics to fulfill the Requirements Profile of a load, appliance or other aspect of a circuit) display 1905 may be shaded in three sections 1907 corresponding, which correspond with those three sections, as pictured. Another three sections, 1909, by contrast, may be unshaded to signify to a user that they have been depleted of electrical characteristics and capabilities, and/or have been deactivated and isolated from supplying power to the circuit of which battery 1900 is a part. Another indication 1911, may also indicate if a section is damaged or otherwise incapable of being engaged to supply power to the circuit, even if battery 1900 is recharged. Generally, however, if their corresponding sections are recharged or otherwise restored to a condition in which they have sufficient capabilities or characteristics required to power the circuit, each of the sections of display 1905 will again each become shaded to signify that capability.

In a preferred embodiment, control unit 1903 activates and connects a single section 1901 for initial output from battery 1900 (while disengaging and electrically isolating other sections 1901), and proceeds to use that section to output power until it is depleted to a point that its performance will no longer meet a required standard for supplying a circuit (such as a voltage, current, or power output standard for a battery type that battery 1900 comports with). Following that, the control system disengages that section, isolating it from the circuit of which battery 1900 is a part, and activates and connects another section 1901 with greater electrical capabilities or characteristics, until that section is then depleted to the same degree, and proceeds until each section 1901 is depleted. After a section 1901 is disengaged, in this process, its electrical characteristics and capabilities may rebound during rest. If the control system determines that such a rebound has occurred to a degree where a section is no longer depleted to a point that its performance will not meet the required standard, the control system may again activate and engage that section. But, in other embodiments, more than one cell may be engaged simultaneously, and display 1905 may indicate a different partitioning, or an overall capacity and charge level of battery 1900.

In other embodiments, the control system may, according to other aspects set forth in the present application, assess electrical characteristics gaps, both internally and externally from battery 1900, and create gap-filling electrical characteristics. In still other embodiments, the control system of battery cell 1900 may assess and fulfill a predicted Requirements Profile of a present or anticipated load, or engage additional, reaction controlling hardware (such as internal chemical reaction interface controlling hardware within an anode, cathode or electrolyte.

Figure 20:
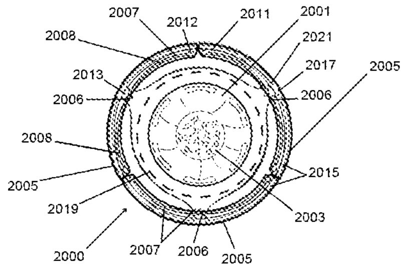
FIG. 20 is a front view of an exemplary expandable, rechargeable battery, with multiple-format compliance capability.

FIG. 20 is a front view of an exemplary expandable, rechargeable battery 2000, with multiple-format compliance capability. Battery 2000 is generally cylindrical in shape, and when viewed from the top, as in FIG. 20, has a generally circular shape (as pictured). Battery 2000 comprises a central core 2001, which is an enclosed volume containing battery components, such as anode material, cathode material, separator material, electrolyte, and contacts, such as exemplary positive terminal contact 2003. However, battery 2000 also comprises outer form factor components that are physically expandable and compressible to suit different applications, some of which applications may be for a variety of standard battery sizes and other characteristics. For example, in the configuration pictured in FIG. 20, outer push heads 2005 are in an inwardly-compressed configuration, yielding a relatively small diameter form factor for battery 2000, approximately corresponding with the diameter and shape of an American National Standard Institute size AA battery.

Push heads 2005 hold the pictured, inwardly-compressed position through a combination of physical aspects and related structures. First, in the inwardly-compressed position pictured, push heads 2005 abut one another, providing opposing structural forces to one another that aid in maintaining their position, and providing outward force against the walls of a battery installation compartment, if battery 2000 is installed in such an installation compartment of an appliance. In addition, push heads 2005 comprise, in their outer surfaces (and, in some embodiments, elsewhere), an elastomeric or otherwise gripping material, aiding in preventing slippage of push heads 2005 against one another and against the walls of a battery compartment. Push heads 2005 are also preferably slidingly engaged with partially inserted flexible spring joists, such as the examples pictured as 2007. Each push head 2005 comprises two inserted spring joist sections, such as the examples shown as 2008, inserted through a central, inward-facing port 2006 of each push head. In the compressed configuration pictured, spring joists 2007 are substantially maximally inserted within push heads 2005 through ports 2006 and, as such, spring joists 2007 extend almost completely into spring joist-hugging interior channels, such as the example shown as 2011, of push heads 2005. A ball or barb, such as the example shown as 2012, at the distal end of each spring joist 2007, prevents (by colliding with a port 2006 and against a dividing stanchion, such as example 2013) the complete escape of spring joists 2007 from ports 2006, the risk of which would otherwise occur in other, less compressed configurations of battery 2000. Spring joists 2007 are preferably comprised of a flexible, force-biased material and, when inserted to any degree within channels 2011, spring joists 2007 are not bent past their elastic range and tend to press themselves outward through ports 2006, due to that force-bias and their elastic properties. Also preferably, channels 2011 are comprised of a flexible material, and further comprise ramping that tends to push balls or barbs 2012 toward ports 2006.

In combination, all of the force biasing and flexible properties discussed above tend to cause battery 2006 to evenly, gradually expand within a battery installation compartment, occupying whatever size compartment is present surrounding battery 2000 and maintaining a central location of core 2001 and contacts at the ends of battery 2000, such as contact 2003, against contacts present in such a battery compartment. An exemplary expanded configuration is shown and discussed in greater detail in reference to FIG. 21. These aspects allow battery 2000 to fill a wide variety of standard size battery compartments, in terms of width. To accommodate differences in length of such standard size battery compartments, a section comprising at least one of the contacts of battery 2000 may also extend to a variety of lengths, for example, with spring loading connecting that section with the remainder of battery 2000. Alternatively, at least one contact 2003 of battery 2000 may itself be flexible and force-biased to extend past a minimum, compressed length, which length corresponds with the shortest standard length that battery 2000 is intended to comply with. Similarly, when maximally extended by force bias, the at least one contact, such as 2003, may correspond with the longest standard length that battery 2000 is intended to comply with. In a preferred embodiment, a control system resident within battery 2000 (which may be the control system discussed with reference to FIG. 13) may be connected with sensor hardware capable of determining the degree to which push heads 2005 and contact 2003 or a section comprising it are extended, and determine if battery 2000 is installed in a particular standard sized battery compartment. From this, the control system may further determine that battery 2000 is intended to be used as a battery type corresponding with that determined size and, accordingly, engage different sections of anode and/cathode material within core 2001, as discussed with reference to FIG. 19, above, and/or place them in different serial and parallel arrangements to create a voltage corresponding with the standard size battery determined to be intended. Alternatively, different reaction profiles and amounts may be used, and power conversion, transformation or exporting techniques discussed elsewhere in this application may be used by the control system, with the hardware required for those techniques comprised in battery 2000, to achieve the electrical characteristics and capabilities of the intended battery type.

Biased wall-building, bridging joists, such as the example shown as 2015, also may be incorporated in battery 2000, to aid in maintaining the expanded or compressed round or cylindrical positions of push-heads 2005. As with spring joists 2007, bridging joists 2015 comprise ending balls or barbs 2021 to prevent their total escape, and are at least partially inserted into and slidingly engaged with channels (in this instance, channels such as the example shown as 2017) on the interior of push-heads 2005. As with channels 2011, channels 2017 are preferably semi-flexible and ramped, creating a bias toward extruding and pushing out joists 2015, further aiding in causing a general, uniform expansion of push heads 2005 to fill the cavity of a battery compartment, while maintaining a cylindrical or circular profile of battery 2000. This type of uniform expansion, and some of the standard sizes that may be occupied by the expansion, may be better understood with reference to FIG. 21, below, depicting a semi-expanded configuration of battery 2000.

In an alternative embodiment, rather than have a central battery core 2001, the remaining aspects of battery 2001, including a flexibly extending electrical contact and control unit and its attendant hardware, may be configured to receive a standard size battery along a cut-out cylindrical cavity (shown by dashed line 2019). In this embodiment, a user may insert a standard (e.g., an American National Standard Institute size AAA battery) in cavity 2019, allowing it to be adapted for use in a wide variety of different-sized applications.

Figure 21:
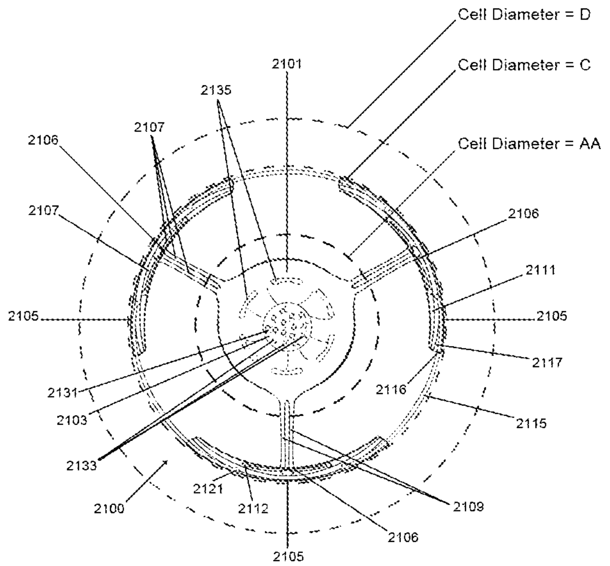
FIG. 21 is a front view of the same exemplary expandable, rechargeable battery, with multiple-format compliance capability as pictured in FIG. 20, but in a more expanded physical configuration.

FIG. 21 is a front view of the same exemplary expandable, rechargeable battery, with multiple-format compliance capability as pictured in FIG. 20 (now 2100), but in a more expanded physical configuration. The push heads (now 2105) have now been pushed further away from the central core (now 2101) creating a larger diameter outer profile for battery 2100. More specifically, the profile created now has a diameter substantially compliant with the diameter and shape of an American National Standard Institute size C battery, which is substantially larger than that occupied by battery 2100 when in a more compressed configuration. As discussed above, a combination of force-biased, flexible structural pieces have contributed to causing and maintaining this expansion. For example, the inserted spring joist sections 2008 within push heads 2105 have partly been expelled from the central ports (now 2106) of push heads 2105. Again, this is due to both the flexible, rebounding spring structure of the flexible spring joists (such as the examples now shown as 2107) that are closer to a resting conformation when more parallel one another, as shown by exemplary parallel sections 2109, but also due to the squeezing force of ramped walls of the interior channels (as in the examples now shown as 2111 and 2117) that tend to squeeze and push spring joists 2107 and the bridging joists (now exemplified as 2115) from push heads 2105 through side ports, as exemplified by 2116. In the partially expelled positions shown, joists such as 2107 and 2115 have permitted the inner surfaces of channels 2111 and 2117 to push outward from the center of each push-head 2105, in the process of expelling the joists.

As discussed above, battery 2000/2100 will naturally tend to occupy the space of a battery compartment in which it is placed to the same degree as a battery cell of the type that the compartment is designed to accommodate. In addition, however, to aid battery 2100 in achieving a standard or otherwise desirable profile and configuration, ridges or other positive stops (not pictured) may be incorporated within channels 2111 and 2117 to encourage or reversibly hold the joist balls (now exemplified by 2112 and 2121, at the ends of the joists) in a position corresponding with the standard or desired profile created by push heads 2105.

After removing battery 2100 from a battery compartment, push heads 2105 will gradually tend to expand further, until a maximum desired profile is achieved—such as the size and profile of an American National Standard Institute size D battery, as demonstrated by the outer-most dashed circumference line in the figure.

To aid battery 2000/2100 in establishing electrical connection between its contacts, such as positive terminal 2003 (now shown as 2103)—especially in the context of a linearly extendable and compressible contact, to accommodate different length compartments—a gripping texture 2131 may be included, preferably with extending pointed or edged ridges 2133. As an added benefit, the resulting points of contact may aid in penetrating and, especially with a burning electrical current which is resultantly focused on a point of contact, destroying grease or other soil barriers impeding optimal electrical current. To further aid in establishing contact where some degree of drift may occur with battery expansion, additional periphery contacts, such as the examples shown as 2135, may also be included, even with a positive contact (as pictured), while still maintaining the general profile and visual cue of the type of contact that it is, due to the small, circular central contact area.

After using battery 2000/2100 in a particular appliance, a user may rapidly and intuitively return it to a smaller conformation, if desired, by providing substantially even inward pressure on push heads 2005/2105. It should be understood that, although the expanding inserted and extruded structures set forth in this application are preferred, they are not exhaustive of the many different approaches to providing a multiple-format compliant battery. For example, a malleable, expanding matrix (such as a compressible foam) may be used to surround battery core 2001/2101, or multiple fixed jackets with various battery size profiles that may be interchanged may also, or alternatively, be used. The particular embodiments set forth in this application are exemplary only, and not exhaustive of the innumerable alternative embodiments for carrying out aspects of the present invention.

Figure 22:
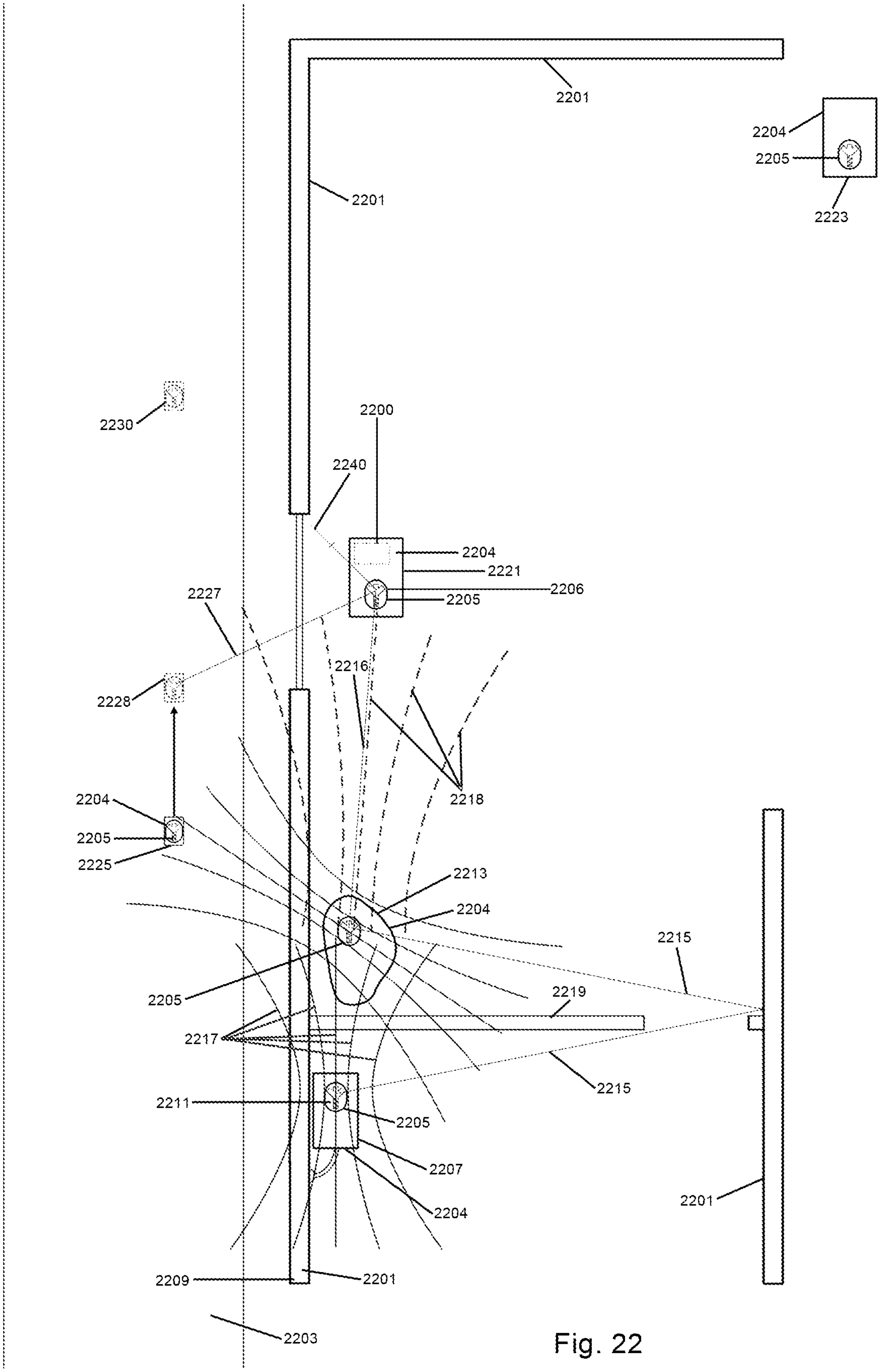
FIG. 22 is a top-view of a scene comprising building and neighboring walkway, and depicting power and information transmitting, resonating, and receiving equipment implementing aspects of the present invention.

FIG. 22 is a top-view of a scene comprising a building 2201 and neighboring walkway 2203, and depicting power and information transmitting, resonating, and receiving equipment implementing aspects of the present invention. Depicted in the scene are several wireless power enhancement devices 2204, each comprising a transmitter and/or resonator apparatus 2205, controlled by at least one control system, such as the example shown as 2200, connected to it, such as the control system set forth above, in reference to FIG. 13. For example, power- and information-transmitting base station 2207 is one of those devices, and, among other capabilities, serves to supply power wirelessly to other devices. Base station 2207 is shown with a direct, wired connection to a wired electrical power outlet in one of the walls 2209 of building 2201. Using its embedded transmitter and/or resonator apparatus 2211, base station 2207 may be able to convert wired electrical power thus received from building 2201 into: (1) emitted electromagnetic radiation, and/or (2) magnetic or electric fields, which may be oscillating or periodic in some embodiments. Base station 2207 may thus transmit wireless power through its embedded transmitter and/or resonator apparatus 2211, in the form of electromagnetic radiation and/or magnetic or electric fields and, in some embodiments, may also transmit information by modulating the electromagnetic radiation and/or magnetic or electric fields, as applicable, transmitted to the other depicted devices, which receive and convert the wirelessly received power to other, useful forms of energy, as needed.

Each transmitter and/or resonator apparatus 2205 depicted in the figure may comprise an antenna or other electromagnetic transmitter which may be capable of directional transmissions (e.g., creating a laser or other focused beam, or directed field). In addition, each transmitter and resonator apparatus 2205 may comprise a resonant coil (or, in some embodiments implementing wireless power transmission with electric fields, an electrode set configured for capacitance) within a body, such as the example shown as 2206, which, when exposed to some forms of wireless power transmissions—and, especially, magnetic fields-experiences resonance, amplifying or otherwise strengthening or enhancing and creating a magnetic field (or electric field) that extends into more space than without the resonant coil or body present and so exposed.

In a preferred embodiment, base station 2207 transmits both information and power in at least one single instance of an electromagnetic wave or magnetic field, thereby increasing efficiency and reducing the costs of identifying information related to the treatment of power transmitted in that single instance (or a related wave or field), much in the way that power and information can be transmitted simultaneously using common wired electrical connections in FIG. 8, above. Also as with FIG. 8, above, base station 2207 may create and issue leading signals or other information-embedded phenomena, which are relevant to the treatment of power transmissions (in this instance, wireless power transmissions) sent following such a leading signal. Similarly, any other device 2204 may be capable of creating information and signals, such as the leading signals discussed above, relevant to the transmission and management of wireless power. The information transmitted may include the type(s) of power transmitted, the identity of the source(s) of the power (including strengths, percentages, and attribution ratings for transmitted power from each power-contributing device). Preferably, each device 2204 is capable of assessing the identity of any other device either receiving or transmitting wireless power from, to or through it, and is capable of sending signals stating that identifying information and power received, converted or transmitted, and attributing a contribution value and/or weighting to each contributing device (including itself). In addition, and as will be discussed in greater detail below, in reference to FIG. 23, each device 2204, or base station 2207 (or a control system comprising either of them) is capable of assessing a total power received or sent wirelessly to or through it, and is further capable of determining and attributing a contribution amount or rating to any other device contributing or receiving power from, to or through the device. In a preferred embodiment, each such device, and a control system comprising at least one of such devices, share such identifying, rating and amount information, and cross-check one another for agreement. If a disagreement as to power source amounts or contribution attributions for a particular device occur, a majority of a agreeing devices may govern the determination of contribution ratings or amounts and the identity of devices assigned such ratings and amounts (a.k.a., "rating by consensus"). In other embodiments, a device which is in disagreement with a threshold number of devices 2204 or an administrator device or control system may be barred from transmitting or receiving further power or information related to power treatment with other devices, and a violation may be reported to an authority, identifying the source(s) of the disagreement.

Assuming that no such power contribution accounting disagreement has caused any device 2204 to be barred from power delivery or transmission, each device 2204 is then available to receive, contribute or retransmit wireless energy to other devices 2204. Furthermore, in some embodiments, each, or some, of devices 2204 may transmit wireless power selectively, to other particular devices and in a form of wireless power transmission, based on an efficiency assessment of multiple possible power transmission and relay options, through any of devices 2204 and in light of environmental and movement and other activity information. That efficiency assessment, and wireless transmission routing resulting from it, will be explained in greater detail below, in reference to FIG. 23, and in further light of FIG. 22.

Figure 23:
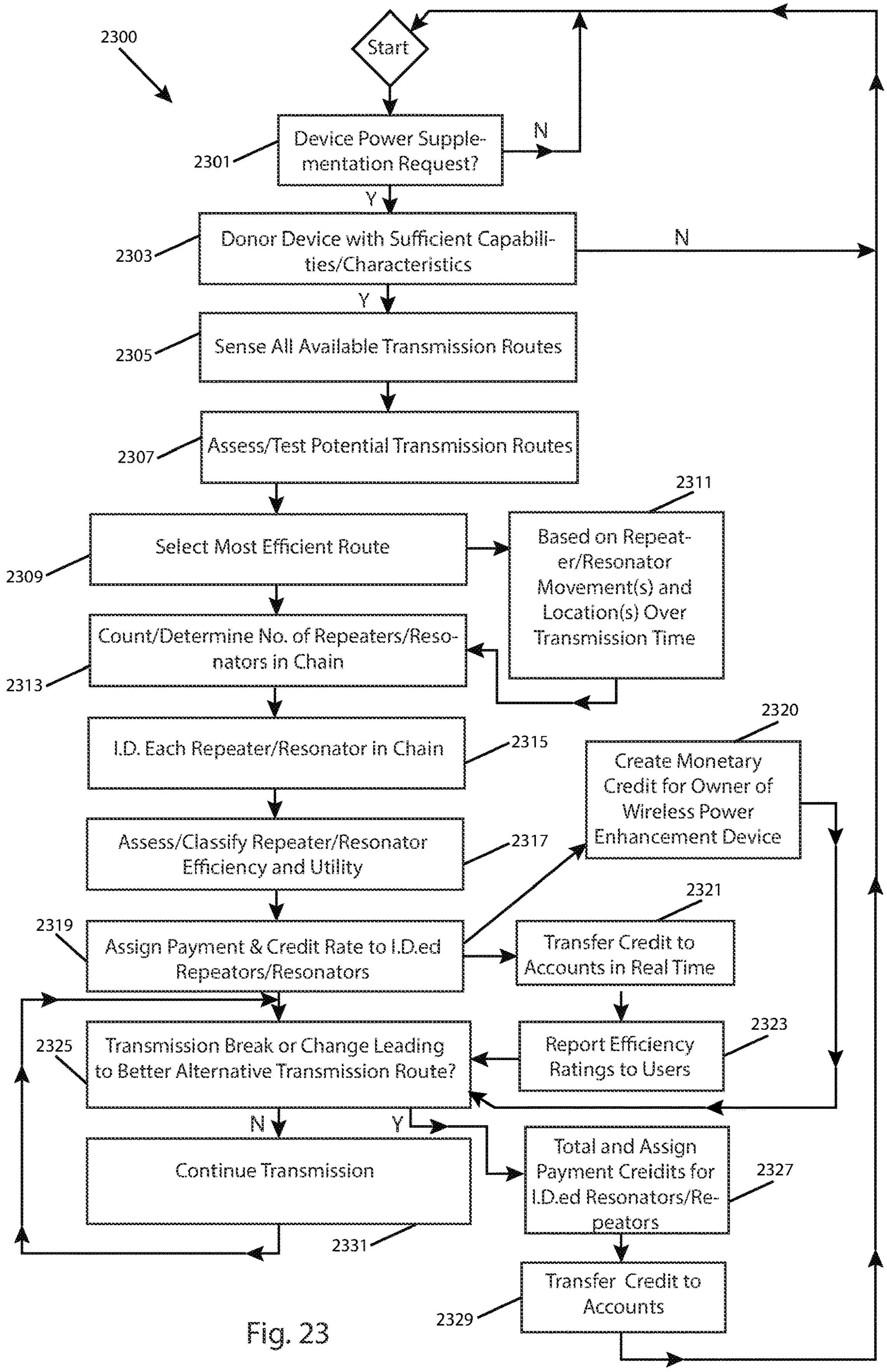
FIG. 23 is an exemplary process flow diagram depicting exemplary steps that may be taken by a control system, such as the control system set forth above in reference to FIG. 13, implementing aspects of the present invention related to wireless power transmission, relaying and sharing.

FIG. 23 is an exemplary process flow diagram depicting exemplary steps 2300 that may be taken by a control system, such as the control system set forth above in reference to FIG. 13, implementing aspects of the present invention related to wireless power transmission, relaying and sharing. As discussed above, such a control system may be comprised in a wireless power transmission base station, such as base station 2207, or in a system comprised in or comprising any or all of devices 2204. Preferably, if comprising more than one device 2204, the control system controls and communicates with at least one device 2204 via wireless communications hardware, such as any of transmitter and resonator apparatae 2205.

The control system begins with step 2301, in which it determines if a wireless power consumption device, such as any of devices 2204, has requested power supplementation from an external source via wireless transmission, such as the wireless power transmission techniques discussed in this application. If so, the control system then determines possible transmission routes, through any number of available intermediary, retransmitting devices, such as the transmitter and resonator apparatae 2205, discussed above. For example, as depicted in FIG. 22, if the consumption device requesting supplementation is a garment or bag with an incorporated computerized device 2213, garment or bag 2213 may transmit a request signal, for example, a radio frequency signal from a comprised antenna or, preferably, transmitter or resonator apparatus 2205, indicating the amount of power supplementation that it needs, above its own stored power or other internal resources, to carry out its ongoing or anticipated operations. In some embodiments, the signal may be sent in a selected direction or route for maximum possible efficiency, based on an assessment of signal strength in all possible transmission directions in the event that it uses a directional transmitter resonator apparatus for communicating the request signal. After establishing communications, and identifying the device 2213, and its need for power supplementation, the control system may then, in step 2303, determine whether a donor device, such as station 2207, has sufficient power-supplying capacity, such as electrical capabilities or characteristics, to provide the needed power (or part thereof) to supplement the requesting device (in addition to, and without compromising its other operations requiring power as a result of providing supplementation). The control system may then, in step 2305, sense and identify all available devices for use in a transmission pathway or route for delivery of the requested power from the donor device (or devices) with the sufficient capacity, capabilities or characteristics. Next, in step 2307, from that list of devices, the control system may then assess and evaluate a wide variety of transmission routes, directly from the donor device to the requesting device, and with any number of additional devices sensed used as intermediaries. As mentioned above, multiple forms of wireless power transmission (such as both electromagnetic radiation and magnetic field transmission), as well as an order of transmission through devices, may also be assessed for resulting efficiency. These pathways may be assessed by test transmissions of different forms, levels and directions (where applicable) of power transmission from the donor, followed by receiving power receipt and re-transmission reports from devices receiving power during such different transmission conditions. Intermediate devices may further test their own retransmission of power in particular forms, and at particular levels and in particular directions. Pathways of transmission through intermediate devices may be selected and excluded in successive test intervals, by control-system-varied gating. For example, using resonant coils of repeating (intermediary) devices 2204 can be tuned "on" and "off"—in other words, to resonate and extend a magnetic field, or not, upon exposure to it—as selected by the control system. Directed transmission emissions and/or receivers may also be used, in some embodiments, to assist in select transmission paths and routes through particular devices 2204, and excluding others. Certain of the intermediary devices may have a different, switchable, deactivatable or selectable resonant tuning (through methods discussed further below) than other devices, to so exclude some devices from different routes to be tested. In some embodiments, multiple resonant coils with differing effective directions, or a single coil with differing or selectable magnetic field direction, may also aid in causing a selected transmission pathway through particular intermediary devices.

Next, in step 2309, the control system may determine, based on the route testing methods set forth above, the most efficient available transmission route from the donor, through particular available intermediary devices, if selected, and to the recipient device. The control system may then proceed to step 2311, in which it further assesses device movement, or transmission impacts from movement and other environmental changes (or projected or determined future changes), and may alter its selection of a power transmission route and type based on a total, integrated analysis of transmission efficiency in light of those assessed or anticipated changes. In any event, the control system proceeds to steps 2313 and 2315, in which it counts, identifies and records each device and/or its comprised repeater and resonator apparatus to be used in the power transmission route selected. Through its testing intervals with the selected route, or in initial implementation of power transmission through the selected route, the control system may next, in step 2317, assess and classify the efficiency and efficacy of each device in the selected transmission path, and, based on that assessment or classification, may assign a payment or credit rating or coefficient for each device (or device owner) proportionate to the device's effective contribution to the transmission of power to the recipient (or recipients), in step 2319. In some embodiments, the efficiency and credit rating, coefficient or multiplier applied may be established by an independent body, and merely applied by the control system upon detecting the type of contributing device. Using that payment or credit rating or coefficient as a multiplier, the control system may then determine an amount of credit, as a percentage of the total power supplied to the requesting device(s), to assign to each intermediary and other source device (or owner). In other words, the control system thus creates at least one monetary credit for at least one owner of at least one wireless power enhancement device(s), as noted in step 2320. In some embodiments, as set forth in step 2321, that assignment is made in real time, creating a running total of credits, which may be applied by an accounting subsystem of the control system. Alternatively, or in addition, in some embodiments, such totals are calculated at intervals (e.g., after transmission ends, once daily, or once monthly) and offsets are applied for power consumed by the intermediary or other source device (or owner). Proceeding to step 2323, in some embodiments, the control system next also reports efficiency ratings to the intermediary or other source device (or owner), comparing the device's ratings and efficacy in transmission or retransmission over distances and in particular sensed conditions, and in comparison to average or other devices used as intermediate or other source devices. From this information, a user can determine if the device he or she is using is earning him or her, or costing him or her, more money than warranted based on the cost of the device, and purchase more efficient, effective devices in the future. In addition, in some embodiments, government agencies mandate minimum performance figures and devices can be approved or disapproved for credits and usage based on a failure to meet those figures.

As with the battery transmission and characteristics sharing methods set forth earlier in this application, any of the intermediary devices in the route also are partial recipients in some embodiments, if also issuing supplementation request signals supplied by the control system, in addition to retransmitting or resonating to extend power transmission to other recipient or intermediary devices, in the particular route selected. In such instances, credits and charges may be resolved in real time, and as a net flow, while implementing aspects of the invention. It should be noted that the routes considered and selected by the control system may be quite varied and simultaneously co-implemented, both to increase wireless power transmission efficacy and efficiency, and to guard against transmission breakdown. For example, turning again to the examples set forth in FIG. 22, garment or bag device 2213 may be supplied both by a reflected radiation beam 2215 and a magnetic field 2217, from base unit 2207. The reflected transmission angle for electromagnetic radiation transmission may be preferred due to the radiation hardness or shielding of intervening wall 2219, which can be determined by trial and comparison of different transmission angles, informed by responses from receiving and intermediary devices in the transmission route. Bag or garment 2213 may serve as either or both a recipient of wireless power and a re-transmitting intermediary device, and even as an original source itself, if a control system determines that it has sufficient characteristics and capabilities to maintain its own operations, while also supplying supplemental wireless power to other devices. In some embodiments, threshold local power contents and desired earnings levels and cost-efficacy of the device and other setting may be variably selected by a user, determining, in part (along with efficiency analyses discussed herein), whether and when retransmission and sourcing to other devices takes place. For example, a comprised transmitter and resonator apparatus 2205 of bag or garment 2213 may serve to extend magnetic field 2217 along new, extended lines 2218, and receive and retransmit electromagnetic beam 2215 as new directed beam 2216, to another device, such as laptop computer 2221, further from base station 2207, or convert and transmit its own stored power, if appropriate given its owner or administrator's settings. As another example, with respect to the available routes and efficiency analyses of steps 2305-2309, if device 2221 is the device requesting power, giving rise to steps 2301 et seq., the control system may determine that device 2223 is too remote, giving rise to too wasteful a transmission route, if included in the transmission of power from base station 2207 to device 2221. As another example, even if receiving wireless power, device 2221 may also serve to retransmit or further extend the transmission route, as determined by the control system, to reach an external personal digital assistant device 2225. Although device 2225 may be at a distance from all other devices prohibiting effective transmission of power through magnetic induction, line-of-sight for an electromagnetic radiation power transmission beam 2227 may be possible, at least at position 2228 (which PDA device 2225 may be projected to be moving or accelerating toward), and that method may be selected and implemented by the control system accordingly, for the projected time period in which line-of-sight will be possible. At a later position, shown as 2230, line-of-sight may no longer exist between devices 2225 and 2221 (as shown by failed direct transmission line 2240), and the control system may terminate the transmission, or a route including both of them will not be selected, at that time and position. The control system may also determine that the fleeting nature of the transmission counsels against ever establishing a route including the two devices, if the assessment and implementation costs are too great to justify it.

Proceeding to step 2325, the control system next determines whether there has been a break or other interruption in the wireless power transmission route currently being implemented, or if another tested or testable route, through a different group of intermediary devices, may provide a more efficient or effective transmission of wireless power to the requesting device(s). If so, the control system may terminate the transmission route, if not substantially or justifiably functioning based on its efficiency on an interim basis over other alternatives, and returns to the starting position, to re-evaluate potential transmission methods and routes, repeating steps 2300. Before doing so, however, the control system may proceed to steps 2327 and 2329, in which the credits for all devices used in the wireless transmission interrupted (or their owners) are credited proportionately for their relative contributions to the transmission just terminated, in some embodiments, and account balances may be updated based on accrued transmission assistance credits and power usage charges, as discussed above. If, at step 2325, the control system determines that no interruption in transmission, or superior alternative route for transmission has been discovered, the system continues implementing the selected wireless power transmission route, in step 2331, and returns to step 2325.

Figure 24:
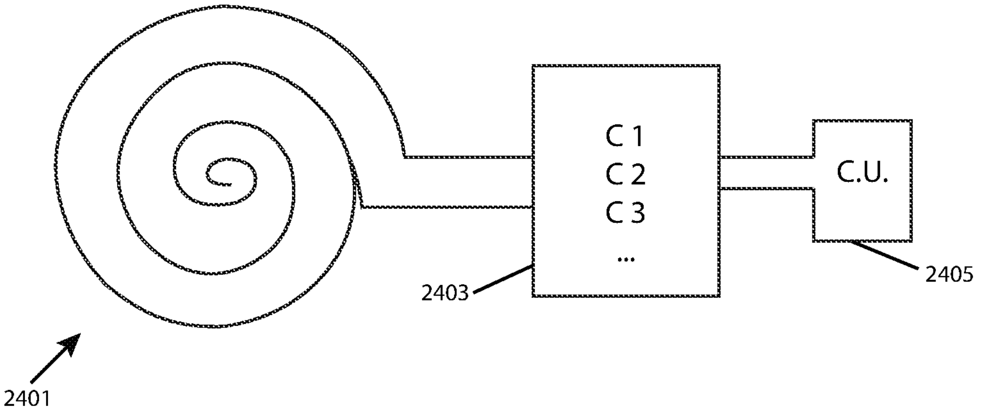
FIG. 24 is a side view of an exemplary magnetic induction coil for receiving wireless power, along with a set of separately-electrically-connectable capacitors, and a control unit, which may include a control system such as the control system discussed above, with reference to FIG. 13.
Figure 25:
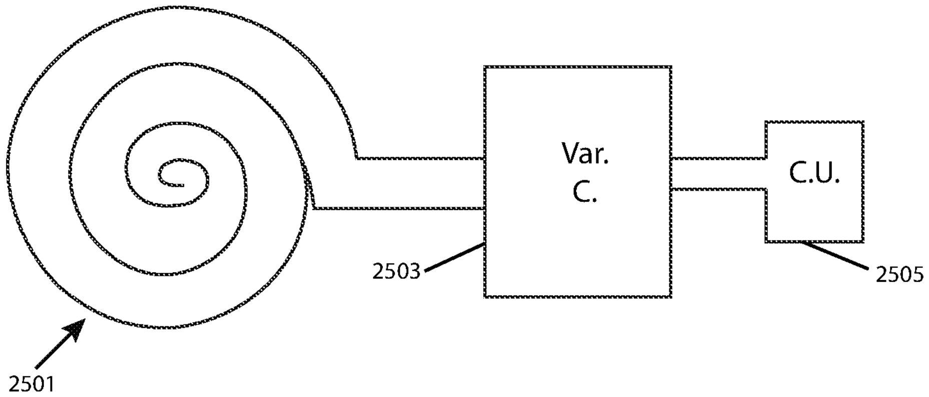
FIG. 25 also depicts an exemplary magnetic induction coil, similar in nature to the coil depicted in FIG. 24, except that a variable capacitor is substituted for a variably-connectable series of different capacitors.

FIG. 24 is a side view of an exemplary magnetic induction coil 2401 for receiving wireless power, along with a set of separately-electrically-connectable capacitors 2403, and a control unit 2405, which may include a control system, such as the control system discussed above, with reference to FIG. 13. Coil 2401 comprises a control-unit-tunable resonance, such that it can be selectively, more readily induced to create electricity from a detected electromagnetic field in which it is immersed. Similarly, FIG. 25 also depicts such a coil, 2501, except that a control-system-variable capacitor 2503 is substituted for a variably-connectable series of different capacitors. By sensing and otherwise determining the resonant settings and capacitance for a given magnetic field—for example, by sensing the field or sensing increases in inducted power with changes in tested capacitance levels—the control unit (2405 and 2505, respectively) can optimize the receipt and conversion of wireless power and, in particular, as the ideal resonance may be altered by different orientations or movement of coil 2405 or 2505, relative to the magnetic field in which it is immersed. Sensors connected to an able to communicate with the control unit 2403/2503 may aid the system in sensing inducted power at various tested capacitance settings. Testing may be by random variation of the capacitors conditions and/or inclusion in the circuit by the control unit, and directionally informed. For example, if an increase in capacitance yields greater induction in the circuit, the control system may switch in another increased capacitance, both above and below the previous increase, to determine if those changes further enhance induction. In some embodiments, other components within a common circuit with coil 2401/2501, aside from capacitors, may be controlled by the control system to alter the coil's resonance, in the same way that the capacitors 2403/2503 are used in the embodiments pictured. In addition, as will be discussed further below, the control unit 2403/2503 may sense, using auxiliary sensors, the orientation of a surrounding magnetic field, to further enhance and create a matching resonance.

Figure 26:
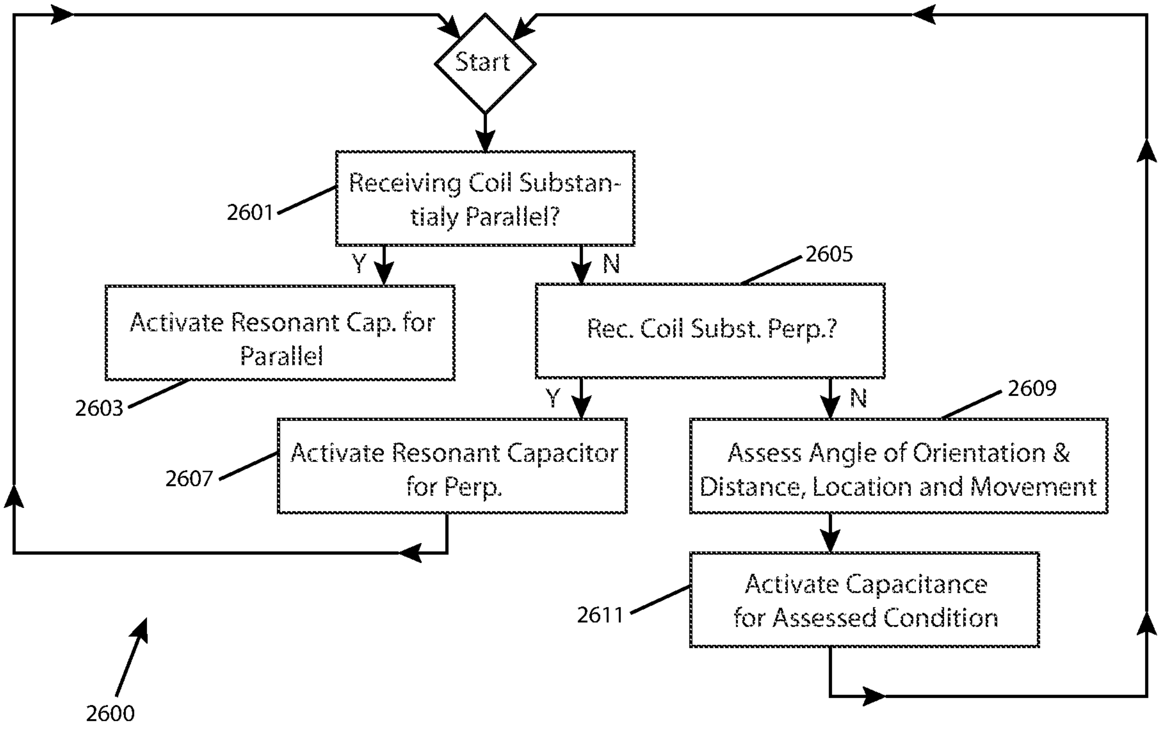
FIG. 26 is a flow chart depicting additional exemplary steps which may be taken by a control system, such as the control system set forth above in reference to FIG. 13, implementing aspects of the present invention related to wireless power and magnetic field driven induction in tunable coils.

FIG. 26 is a flow chart depicting additional exemplary steps 2600 which may be taken by a control system, such as the control system set forth above in reference to FIG. 13, implementing aspects of the present invention related to wireless power and magnetic field driven induction in tunable coils. Beginning with step 2601, the control system may determine whether the orientation of an induction coil, such as coil 2401 or 2501, relative to a power-transmitting coil or other device creating a magnetic field in which the coil is immersed, is parallel. Proceeding to step 2603, the control system may then assess and set a capacitance in the coil, or otherwise alter the resonant frequency of the receiving coil that is optimized for that parallel orientation. If, at step 2601, the control system determines that the receiving coil is not oriented in a substantially parallel configuration, it may proceed to step 2605, in which it determines whether the receiving coil is instead in a substantially perpendicular orientation relative to the magnetic field, and, if so, proceeds to step 2607, in which it activates a capacitance in the coil, or otherwise alters the resonant frequency of the receiving coil, to optimize it for that perpendicular orientation.

In some embodiments, multiple, separately activated coils configured in different orientations optimized for different directions of inducing magnetic fields may be, instead, activated and connected to the control system to optimize the receipt and conversion of wireless power via magnetic induction.

If the receiving coil is neither substantially parallel nor perpendicular to the magnetic field, the control system may proceed to step 2609, in which it assesses the angles of orientation between the coil and the magnetic field source, and then selects and activates a resonance appropriate for that angle of orientation, in step 2611. In addition, the control system may alter the resonance of the coil to match an effective change in the magnetic field caused by movement or acceleration of the receiving coil through the magnetic field, as well as its orientation as discussed above.

Figure 27:
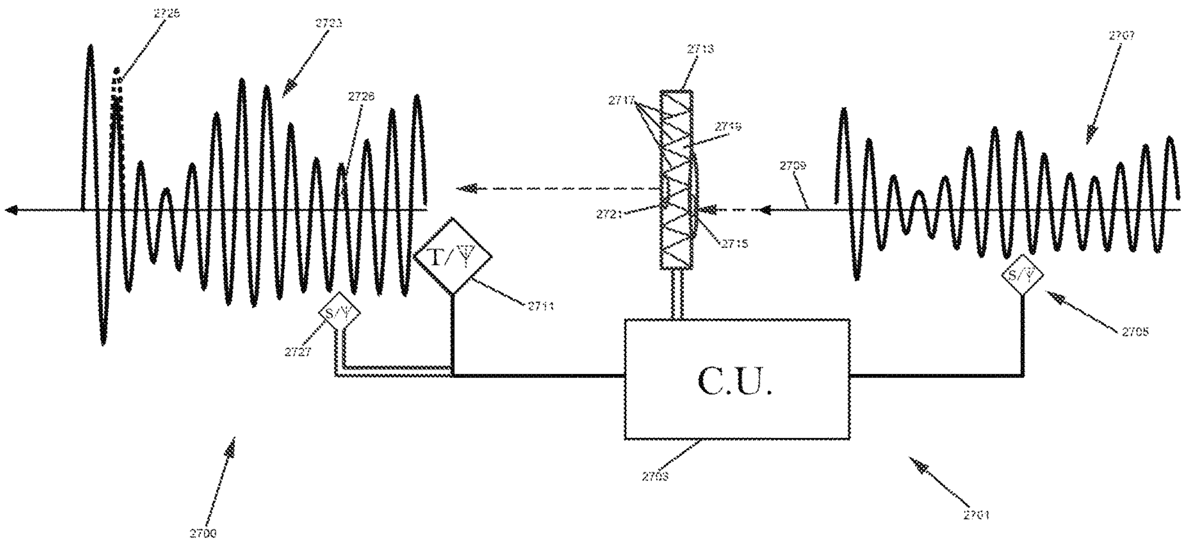
FIG. 27 is a side view depicting aspects of a wireless power transmission apparatus and method, involving the selective enhancement and other modulations of ambient radiation, fields and/or waves.

FIG. 27 is a side view depicting aspects of a wireless power transmission apparatus 2700 and method, involving the selective exaggeration and other modulations of ambient radiation, fields and/or waves. Transmission apparatus 2701 comprises a control unit 2703, such as a control unit comprising the control system discussed above, with reference to FIG. 13. Control unit 2703 is electrically connected to, and able to communicate with, an antenna or other wireless power transmission sensor device 2705. Antenna/sensor device 2705 is preferably located up stream of a source of a wireless power transmission, such as electromagnetic wave transmission 2707, shown propagating from the right-hand side of the figure, toward the left-hand side of the figure (as demonstrated by propagation direction arrow 2709), and is able to detect waveform characteristics, or other ambient power transmission aspects of transmission 2707. Antenna/sensor device 2705 then relays a signal with information describing the waveform and other aspects along a conductive wire, or via other communications transmission methods, to the control unit 2703. Preferably, that description also includes time and location information associated with each detected aspect of transmission 2707. For example, antenna/sensor device 2705 may detect that transmission 2707 is generally sinusoidal in waveform, while also comprising modulation (for example, of a sinusoidal carrier wave). In the example provided, transmission 2707 is amplitude-modulated, as demonstrated by the apparent crests and troughs in the waveform, which vary in height according to the embedded modulation. Transmission 2707 may be an ambient wave, existing in the atmosphere before implementation of transmission apparatus 2701, such as a radio wave transmitted from a nearby radio station tower.

It should be noted at this point that, while the general example of an electromagnetic wave is given for transmission 2707, and an amplitude-modulated radio wave in particular, a wide array of other, alternative or additional, wireless energy transmission phenomena and media may be employed, implementing aspects of the present invention. For example, a frequency-modulated electromagnetic wave, or an ambient compression or other particle wave or a magnetic field may be sensed by sensor 2705, and their characteristics and aspects signaled to the control unit, and subject to further amplification and directed modulation, as will be discussed in greater detail, below. The precise example provided is exemplary only, to aid in comprehension and discussion.

Upon receiving the signal from sensor device 2705 describing aspects of transmission 2707, the control unit 2703 then processes that transmission, and determines and analyses embedded and other characteristics of transmission 2707. Among other things, control unit 2703 may determine, as mentioned above, that ambient transmission 2707 is generally sinusoidal in nature, and that a sinusoidal carrier wave has been subjected to amplitude modulation. The direction of propagation, timing, and location of particular crests, troughs (which may be superposed) at particular times may be determined and projected by the control unit. For example, based on the determined direction of propagation (shown as from the right-hand side toward the left-hand side of the figure) and the speed of the transmission in the medium, the control unit 2703 may project the later location (e.g., 3.33 nanoseconds after arriving at sensor 2705, any sensed part of transmission 2707 will be one meter to the left). Thus, as pictured, the control unit may determine that transmission 2707 will be at the position of an antenna or other transmitter 2711, at a particular time determined by the system, based on a fixed distance of transmitter 2711 relative to sensor 2705 in the direction (or vector component) of propagation of transmission 2707. In one embodiment, the direction of propagation is along the line between center points of sensor 2705 and transmitter 2707, but, in other embodiments, the direction of propagation is in a direction only partially in the direction of that line, and a substantially smaller amount than the vector component along an axis perpendicular to the line. In this latter configuration, the system has a longer time to process and analyze the characteristics of transmission 2707, and take action based on them. To further dilate that time, the control unit may also capture and reflect, or otherwise slow the advancement of transmission 2707. For example, a capturing and internally reflecting device 2713 is shown, connected to apparatus 2701, for that purpose. As transmission 2707 moves toward the left-hand side of the figure, as pictured, it may enter a receiving port and/or lens 2715. A series of internal reflections, such as those pictured as 2717, may then occur within a contained space 2719 of reflecting device 2713. In practice, this may comprise thousands or millions of reflections, or may be along a long length of bundled transmission media, such as an optical fiber, to dilate the time for the control system to take action. After that series of reflections and/or run through transmission media has occurred, the transmission is then exited through an exit port or lens 2721, and sent again toward transmitter 2711 (e.g., in the original direction of propagation). Because control system 2703 is programmed with information describing the total distance traveled, and the time in which it will travel through, internally-reflecting device 2713, the control system remains able to project the time that all parts of transmission 2707 detected at sensor 2705 will be at transmitter 2711 (albeit at a later time than without device 2713. Preferably, gathering port and/or lens 2715 is wider than exit port and/or lens 2721, and focuses electromagnetic transmissions captured within it into a narrower, more collimated beam, with is then easier to harvest and utilize at a device later receiving it—which may incorporate a rectenna for that purpose. In some embodiments, device 2713 may cause transmission 2707 to at least partially overlap with itself prior to emission from port and/or lens 2721, for example, resulting in an emitted transmission of greater frequency than transmission 2707.

In any event, based on its analysis of aspects of transmission 2707, and its projection of the times when parts of transmission 2707 will be at transmitter 2711, the control unit may then implement aspects of the invention for using the characteristics of those aspects to enhance the delivery of wireless power transmissions (or, in some embodiments, communications transmissions). For example, control unit 2703 may use transmitter 2711, and other transmission hardware within the control unit, to amplify transmission 2707 as it arrives at transmitter 2711, as pictured—by producing a matching, constructively superposing waveform, and thus creating a resultant transmission waveform 2723 of a greater amplitude. As another example, the peaks and valleys of modulation may be exaggerated, by the control unit selecting and adding to crests of the transmission with higher amplitude, as shown in exemplary possible amplitude enhancement crest 2725 (second highest crest in the transmission pictured). This method may enhance later ambient power harvesting, at a receiving device, in particular methods of conversion relying on greater differentials between maximum and minimum crests of waveforms. In another aspect, one or more lower crests may be suppressed, as shown in decreased resulting crest 2726, for that purpose. Such targeted, individual crest manipulations may also be useful for encoding and embedding information into resulting waveform 2723, as discussed in greater detail below. In a preferred embodiment, the resulting, superposed beam has an increased frequency—for example, by transmitter 2711 adding an electromagnetic wave that, when combined with transmission 2707, creates such a wave of increased frequency. In one preferred embodiment, ambient radio waves are thus converted to higher energy waves, such as microwaves.

In some embodiments, communications may be embedded within and enhanced by transmission 2707 and control unit 2703's analysis of it. For example, in addition to analyzing a signal related to transmission 2707, control unit 2703 may receive or create an informational signal to be issued from apparatus 2701. By running a matching algorithm, the control unit may determine modifications to make to transmission 2707 which will result in the transmission of the information at a more optimal efficiency. For example, if transmission 2707 comprises a part nearly matching a part of a desired, transmissible information-carrying wave, control unit 2703 may determine a wave for transmission from transmitter 2711 that, when combined with transmission 2707, will result in that desired, transmissible wave. To enhance this matching, perceived repeating patterns in transmission 2707 may be determined and applied by control system 2703, and encoding and functions that result in matching when applied, or linking dispersed information segments, may also be determined and built into the resulting signal, if beneficial, to increase the range of possible matching (with far-flung wave components thereby potentially usable for representing otherwise sequential data). Control unit 2703 may modify many crests or troughs of transmission 2707, and even all of them in some embodiments to embed, encode and create its transmitted waveform 2723, while still applying an optimization routine. One criterion that may result in such universal modifications is a lowest energy parameter, whereby the control unit seeks to expend the least amount of energy in emitting a wave at transmitter 2711 to create the resulting, superposed waveform. While each individual part of transmission 2707 may not be maintained in its original form, the control unit may still minimize its energy expenditures by making the lowest average change to each part. In some embodiments, embedded encoding may comprise instructions (and preferably, optimized, generally applicable functions) for interpreting and recombining parts of waveform 2723. To enhance and increase potential matching and usable source transmissions, transmissions from a wide variety of different frequencies and bands may be sensed by sensor 2705 and subjected to superposition by transmitter 2711. The embedded encoding for distributing and (later, at a receiving device, accessing and interpreting) coded information or enhanced energy transmissions may cross frequencies, and dictate collation of data from different frequencies or bands. This can be done, effectively, without interference with other embedded information, if a key or function for deleting them is also provided, embedded in a signal (or library of a control system comprise in the receiving device).

In some preferred embodiments, capturing and internally-reflecting device 2713 is omitted and, instead of addressing and further modulating the exact same parts of transmission 2707 with transmitter 2711 as that sensed, repeating patterns are determined, and the timing of the occurrence of new transmissions, carrying out the same sensed pattern, at the location of transmitter 2711 are determined by the control system. The control system may then modulate aspects of the new transmissions following that pattern, in much the same way that it modulates a sensed transmission, as discussed above.

To detect and assess the success of creating superposed waveform 2723, in accordance with the characteristics projected or planned, a resulting waveform sensor 2727 may be included in some embodiments. In the event that resulting waveform 2723 does not match the waveform projected or planned by the control system, the control system may assess differences between the planned/projected waveform, and the actual superposed waveform 2723, as detected. The control system may then modify its creation of superposing waves at transmitter 2727 to tune the result, matching the planned/projected waveform more closely. For example, if the detected resulting waveform 2723 has created a multiplex waveform with the peaks of transmission 2707 still detectable, and occurring earlier at the point of detection than wave parts intended to be added, the control unit may advance transmission by the perceived unintended delay detected.

Figure 28:
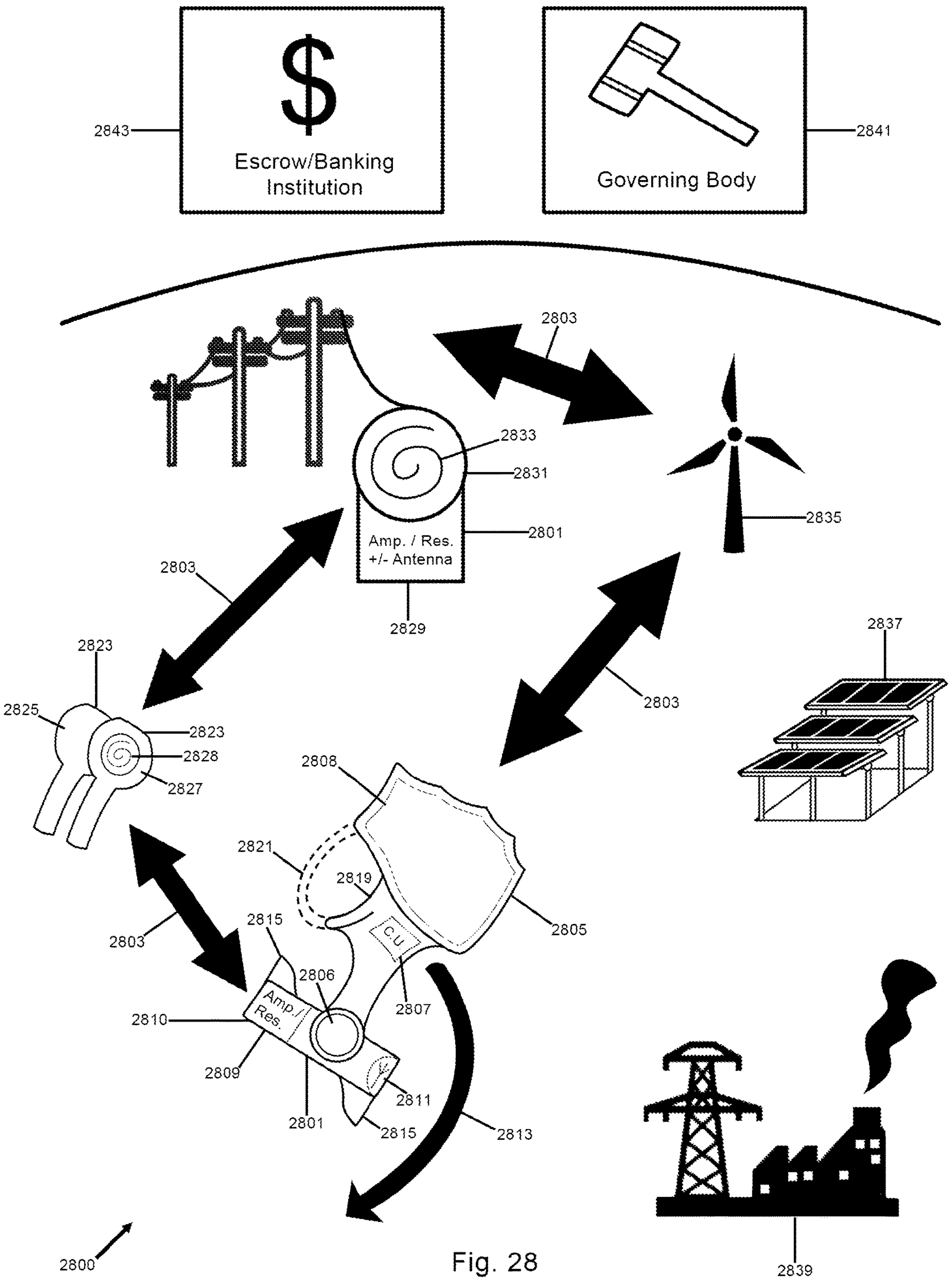
FIG. 28 is a schematic diagram of example new wireless power transmission and incentivization systems, and methods of their use, in accordance with aspects of the present invention.
Figure 27:
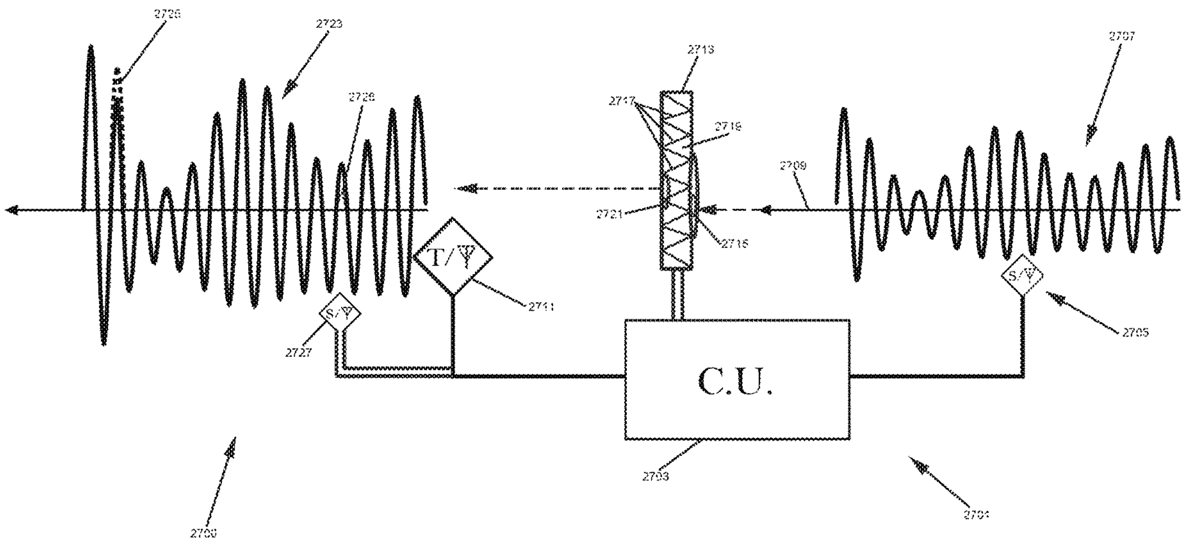

FIG. 28 is an example schematic diagram of a type of new wireless power transmission and incentivization system 2800, and methods of its use, in accordance with aspects of the present invention. Generally speaking, the incentivization system 2800 includes, or is included within, a control system including computer hardware and software (such as, but not limited to, any of the example control systems set forth in reference to FIG. 13) and is configured to manage the transmission of wireless power through one or more intermediate wireless power transmitting device(s) 2801. Also generally speaking, in so managing the transmission of wireless power, at least one of such intermediate wireless power transmitting device(s) 2801 are used to form a wireless power transmission route to an end user of a wireless power transmission. Some example wireless power transmission route(s) are illustrated through wireless power transmission route indicating arrows 2803, in accordance with some embodiments. However, as will be understood by those skilled in the art, the number and type of such intermediate wireless power transmitting device(s) 2801 and routes, as illustrated by route-indicating arrows 2803, are merely examples, and any number and type of such devices and routes including any of them may be used, instead of or in addition to those pictured, in accordance with various embodiments.

Preferably, each intermediate wireless power transmitting device(s) 2801 is configured to contribute to wireless power transmissions managed by the control system by enhancing the strength, reach, harvestability, or other beneficial characteristics of the wireless power transmission, in some embodiments. To so contribute, in some such embodiments, each intermediate wireless power transmitting device(s) 2801 includes one or more wireless power enhancing sub-device(s). Also preferably, in some embodiments, each of the intermediate wireless power transmitting device(s) includes a different unique identifier and unique spatial location(s). In some such embodiments, the wireless power transmission and incentivization system 2800 determines credits and other incentives, and/or debits and other penalties, for particular intermediate wireless power transmitting device(s), or their owners, based on such location(s) and/or identifiers.

For example, one such intermediate wireless power transmitting device(s) 2801, example new form of arm-mountable personal digital assistant device 2805, is shown, and may include an on-board control unit 2807 in some embodiments, comprising computer hardware and software, which control unit 2807 may be a control system such as any of those provided in reference to FIG. 13, above. For illustrative purposes, personal digital assistant device 2805 is pictured as including a wireless power enhancing sub-device 2809 (shown in an example distal location from a user holding it, within wristband/wrist brace 2810). In some embodiments, wireless power enhancing sub-device 2809 may be, or may include, a resonator, which serves to enhance a wireless power transmission by extending the range of a wireless power transmission, in accordance with aspects discussed in this application. In some embodiments, wireless power enhancing sub-device 2809 may include an amplifier, capable of increasing the strength of a wireless power transmission, in accordance with aspects discussed in this application. In some embodiments, personal digital assistant device 2805 may include a transmitter 2811, for creating and/or enhancing wireless power transmissions, in accordance with aspects discussed in this application. In any event, in some embodiments, personal digital assistant device 2805 may enhance some aspects of a wireless power transmission managed by a control system, for another device—which may be owned by a different user than the personal digital assistant device 2805—in accordance with aspects set forth in this application, by controlling and/or actuating any or all of such wireless power enhancing sub-devices, in various embodiments. In addition, in some embodiments, personal digital assistant device 2805 may also receive and harvest some power, without transmitting it on to such other devices, in some embodiments. For example, in some embodiments, personal digital assistant device may include various sub-devices that consume power, such as an example swiveling (via swivel mount 2806) palm-held actuable display screen 2808. In such embodiments, a control system managing wireless power transmissions may then assess and charge debits and/or credits of a type set forth in this application, to reflect the owner of personal digital assistant device 2805's use of such harvested power, as well as for his, her or its enhancement of such a wireless power transmission. In some embodiments, a credit is provided to that user for such enhancements, while a debit is provided for such harvesting and use. In some embodiments, all such debits and credits are summed, and a net debit or net credit is determined and applied to a monetary account of such a user managed by the control system.

In some embodiments, palm-held actuable display screen 2808 may swivel to and from a position (as pictured) which lands at the center of a user's palm of her hand, and a position along the user's forearm (not pictured) along a pathway shown by example swivel motion arrow 2813, assuming that wristband/wrist brace 2810 has been fastened around the user's wrist. In some embodiments a swivel arm 2815 attached to both wristband/wrist brace 2810 via swivel mount 2806, on one end, and palm-held actuable display screen 2808, on the other end, allows this swiveling motion. In some embodiments, other types of motion and fasteners (not pictured) (e.g., linear actuators) may allow a similar relocation to and from a position at the user's palm and a position at her forearm. In some embodiments, such alternative positions may be held or "locked in," preventing unintentional further repositioning of actuable display screen 2808 (e.g., via positive stops within swivel mount 2806). In any event, by locating wireless power enhancing sub-device 2809 at a distal position relative to the user when wristband/wrist brace 2810 is attached to her wrist, which remains distal regardless of the position of actuable display screen 2808, a more exposed, distal wireless power enhancement position is achieved. Elongated wrist pads 2815 may be included, in some embodiments (shown as optimized for use on a user's left arm, with palm facing a viewer of the figure.) Other comfort-enhancing features may include finger and finger attachment accommodating contours 2817, which also impact the shaping of display screen 2808, optimizing usable space, and a thumb-accommodating contoured grip 2819. In some embodiments, contoured grip 2819 is in an alternate, closed, encircling form 2821, allowing a user to thread her left thumb through it. Of course, these details are provided as an explanation of some structural aspects of arm-mountable personal digital assistant device 2805, and do not impact all of the techniques set forth in this application related to transmitting and enhancing wireless power. These aspects are provided as one example of a form of intermediate wireless power transmitting device(s) 2801.

As mentioned above, in some embodiments, other forms of wireless power generating, transmitting and receiving devices are also included in wireless power transmission and incentivization system 2800. For example, in some embodiments, devices capable of receiving and using such a wireless transmission (an "end-user device" such as end user device 2823), enhanced by such an intermediate wireless power transmitting device, for an end user (e.g., the owner of the end user device) are included. As one example of such an end user device, wirelessly powered earphones 2825 and 2827 are provided. In some embodiments, end user devices, such as example end user device 2823, may also include any of the sub-devices enhancing wireless power set forth in this application, such as example resonator 2828. In some embodiments, intermediate wireless power transmitting device(s) 2801 and/or end user devices, such as example end user devices 2823, may also store energy received via a wireless power transmission (e.g., in the form of chemical energy, via a battery on board end user device 2823) for use or transmission in the future. Thus, in some embodiments, end user device 2823, as with intermediate wireless power transmitting device(s) 2801, may have wireless power transmission hardware, such as a second wireless power transmitter, for transmitting wireless power based on a wireless power transmission from a first wireless power transmitter (e.g., from a grid-based wireless power transmitter, as found in grid-based intermediate wireless power transmitting device(s) 2829) and/or resonator 2828, and each of the aspects related to determining a contribution and monetary credits set forth for intermediate wireless power transmitting devices may be applied to end users, based on such contribution. As with personal digital assistant device 2805, such grid-based wireless power transmitters may include a wireless power enhancing sub-device 2831, and/or a transmitter (not pictured). As another example of such wireless power enhancing sub-device(s), a resonator 2833 (such as any of the resonators set forth in this application) may be included within grid-based intermediate wireless power transmitting device(s) 2829. Although grid-based wireless power transmitting devices, such as 2829 may be permitted to determine routes of transmission of wirelessly transmitted power, in some embodiments, the wireless power transmission and incentivization system 2800 implements an incentive plan to reward (e.g., via monetary credits set forth in this application) owners of such devices and grids themselves to adopt the most efficient route of transmission, using any available intermediate wireless power transmitting device(s) and sources of power. In particular, in some embodiments, such an incentive plan may also similarly reward such owners for utilizing green or other particular sources of energy, as first or intermediate transmitters of wireless power.

To generate energy translated into electrical, and then wireless power transmissions, in accordance with aspects of the invention, any known form of electrical and/or wireless power generator and/or transmitter known in the art may be used. For example, in some embodiments, more environmentally friendly or safe energy translators may be used, such as green energy sources. Examples of such green energy sources may include wind power electrical energy generators, such as example wind power electrical energy generator 2835, and/or solar power electrical energy sources, such as example solar power electrical energy generator 2837. Any such devices, as with any of the intermediate wireless power transmitting devices or end user devices set forth above, may be included within system 2800, in various embodiments.

However, it should be noted that, in some embodiments, system 2800 does not include any intermediate wireless power transmitting device(s) 2801 and end user devices, such as end user device 2823, or any power producing devices, such as example wind power electrical energy generator 2835, solar power electrical energy generator 2837 and/or conventional power plant electrical generator 2839, and does not include additional control systems thereof, or of any of the regulator or banking entities set forth below, or any other hardware outside of a main control system comprised within wireless power transmission and incentivization system 2800. However, in any event, wireless power transmission and incentivization system 2800 is configured, through specialized hardware and software capable of managing any such intermediate wireless power transmitting device(s) 2801, end user devices such as end user device 2823, and/or any power producing devices, to carry out any steps in accordance with the methods set forth in this application.

Because any of those power producing devices may include wireless power translation and transmission hardware as discussed in this application, they may create an initial transmission of wireless power, along transmission routes (such as example wireless power transmission routes 2803) which may then serve as the basis for the system to determine contributions and monetary credits and other rewards, and monetary debits and other charges or penalties, in accordance with aspects of the invention. As discussed elsewhere in this application, in some embodiments, at least one base station may be included, which is connected with and able to receive power from a power source such as any of those wireless power generators, wherein the base station comprises a control system and at least one transmitter.

As discussed elsewhere in this application, in some embodiments, the power transmission and incentivization system 2800 is configured to create and/or implement an incentive plan, which includes penalties and/or rewards for owners and/or dealers of power, reinforcing desired commercial activity and/or behavior(s) of those owners and/or dealers. For example, in some embodiments, the incentivization system 2800 includes programming related to such an incentive plan. In some embodiments, the wireless power transmission and incentivization system 2800 accepts commands from an authoritative organization, such as a federal, state or local government or a regulatory entity or other regulatory body 2841. In some such embodiments, such a government or regulator body may be provided with "superuser" status and/or an administrative password, to access the computer hardware and software of the control system comprised in the system, to provide such commands to the system. In other embodiments, the control system of the power transmission and incentivization system 2800 periodically accesses communications, records or commands regarding such an incentive plan held by the regulatory body (e.g., in a separate control system comprising computer hardware and software) and implements such an incentive plan in accordance with aspects of the invention. In some embodiments, to carry out such an incentive plan, and issue monetary credits and/or debits set forth in this application, a separate control system owned by a banking or other escrow entity may also be used to send money to users upon request, provided that such users hold sufficient credits provided to them by the power transmission and incentivization system 2800 in accordance with the incentive plan.

What is claimed is:

1. A system for managing wireless power, comprising:
- one or more wireless power transmitter(s);
- a control system, comprising specialized computer hardware and software configured for:
  - communications with said one or more wireless power transmitter(s);
  - determining one or more spatial location(s) of said one or more wireless power transmitters;
- wherein said control system is configured to determine contribution(s) as an energy source for wireless power transmission(s) by at least one of said one or more wireless power transmitter(s); and
- wherein said control system is configured to determine one or more monetary credit(s) based on said contribution(s).

2. The system for managing wireless power of claim 1, wherein at least one of said one or more wireless power transmitter(s) is configured to be connected to one or more source(s) of power.

3. The system for managing wireless power of claim 2, wherein said at least one of which one or more wireless power transmitter(s) configured to be connected to one or more source(s) of power is a power- and information-transmitting base station configured to be hard wired to an electrical power outlet.

4. The system for managing wireless power of claim 1, wherein at least one of said one or more wireless power transmitter(s) transmits wireless power to an end user device.

5. The system for managing wireless power of claim 4, wherein an owner of said end user device is charged a monetary debit and/or penalty for use of said wireless power.

6. The system for managing wireless power of claim 4, wherein said system for managing wireless power is configured to create at least one monetary credit(s) for at least one owner of said at least one of said one or more wireless power transmitting device(s).

7. The system for managing wireless power of claim 6, wherein the system for managing wireless power is configured to create at least one money payment to said at least one owner of said at least one of said one or more wireless power transmitting device(s) based on said at least one monetary credit(s).

8. The system for managing wireless power of claim 1, wherein at least one of said one or more wireless power transmitting device(s) comprises one or more wireless power enhancing sub-device(s).

9. The system for managing wireless power of claim 8, wherein at least one of said one or more wireless power enhancing sub-device(s) comprise(s) a resonator.

10. The system for managing wireless power of claim 8, wherein at least one of said one or more wireless power enhancing sub-device(s) comprise(s) an amplifier.

11. The system for managing wireless power of claim 8, wherein at least one of said one or more wireless power enhancing sub-device(s) comprise(s) an antenna.

12. The system for managing wireless power of claim 1, wherein said incentives are based, at least in part, on an efficiency rating related to at least one of said one or more wireless power transmitting device(s).

13. The system for managing wireless power of claim 5, wherein said monetary debit and/or penalty for use of said wireless power is applied by said control system to a wireless power provider that does not route said wireless power transmission(s) through wireless power transmitting device(s) that are determined to comprise an efficient route for said wireless power transmission(s).

14. The system for managing wireless power of claim 1, wherein the contribution(s) as an energy source to wireless power transmission(s) are determined, at least in part, based on a consensus of a plurality of owners of wireless power transmitting and receiving devices.

15. The system for managing wireless power of claim 1, wherein the incentive(s) is/are determined, at least in part, based on a consensus of a plurality of owners of wireless power transmitting and/or receiving devices.

16. The system for managing wireless power of claim 15, wherein said consensus is based on at least one contribution amount and/or rating with respect to at least one of said wireless power transmitting and/or receiving devices, and wherein said contribution amount and/or rating is determined based on smart contract(s) recorded on a distributed ledger.

17. A method for managing wireless power, comprising the following step(s):
- providing a system for managing wireless power, comprising:
  - one or more wireless power transmitter(s);
  - a control system, comprising specialized computer hardware and software configured for:
    - communications with said one or more wireless power transmitter(s);

determining one or more spatial location(s) of said one or more wireless power transmitters;

wherein said control system is configured to determine contribution(s) as an energy source to wireless power transmission(s) by at least one of said one or more wireless power transmitter(s); and wherein said control system is configured to determine a monetary credit(s) based on said contribution(s).

18. The method for managing wireless power of claim 17, comprising the following additional step(s):

determining said monetary credit(s) based on said contribution(s).

19. The method for managing wireless power of claim 17, comprising the following additional step(s):

determining a monetary debit(s) based on said contribution(s).

* * * * *